(12) United States Patent
Adolf et al.

(10) Patent No.: US 10,164,476 B2
(45) Date of Patent: Dec. 25, 2018

(54) DEVICE HANDOVER

(71) Applicant: X Development LLC, Mountain View, CA (US)

(72) Inventors: Brian Adolf, San Mateo, CA (US); Michael Grundmann, San Jose, CA (US); Eric Liu, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 231 days.

(21) Appl. No.: 15/370,924

(22) Filed: Dec. 6, 2016

(65) Prior Publication Data
US 2018/0159375 A1 Jun. 7, 2018

(51) Int. Cl.
| | | |
|---|---|---|
| *H02J 50/40* | (2016.01) | |
| *H02J 50/12* | (2016.01) | |
| *H02J 7/02* | (2016.01) | |
| *H02J 50/90* | (2016.01) | |
| *H02J 50/80* | (2016.01) | |

(52) U.S. Cl.
CPC .............. *H02J 50/12* (2016.02); *H02J 7/025* (2013.01); *H02J 50/40* (2016.02); *H02J 50/80* (2016.02); *H02J 50/90* (2016.02)

(58) Field of Classification Search
CPC .................................. H02J 50/40; H02J 7/025
See application file for complete search history.

(56) References Cited

U.S. PATENT DOCUMENTS

| | | | |
|---|---|---|---|
| 8,036,178 B2 * | 10/2011 | Myers | ........................ H03J 7/02 370/331 |
| 9,283,894 B2 | 3/2016 | Shimokawa | |
| 9,446,674 B2 | 9/2016 | Halker | |
| 9,466,988 B2 | 10/2016 | Deyaf | |
| 9,472,983 B2 | 10/2016 | Lee | |
| 2013/0181665 A1 | 7/2013 | Lee | |
| 2013/0272231 A1* | 10/2013 | Dinan | ................... H04W 52/34 370/329 |

(Continued)

OTHER PUBLICATIONS

International Search Report and Written Opinion for corresponding PCT Application No. PCT/US2017/062980, dated Mar. 5, 2018.

*Primary Examiner* — Pinping Sun
(74) *Attorney, Agent, or Firm* — McDonnell Boehnen Hulbert & Berghoff LLP

(57) ABSTRACT

Described herein are methods and systems for facilitating a wireless power handover. In particular, a controller may cause a first transmitter to provide electrical power to a receiver. The controller may then determine that a handover condition is met and may responsively facilitate a handover to a second transmitter. During this handover, the controller may engage in a phase-determination process to determine first and second phases at which the first and second transmitters should respectively provide electrical power to the receiver. Once determined, the controller may then cause the first and second transmitters to respectively provide electrical power to the receiver at the first and second phases and at substantially the same time. Subsequently, the controller may cause the first transmitter to no longer provide electrical power to the receiver and the second transmitter to continue to provide electrical power to the receiver, thereby completing the handover.

23 Claims, 23 Drawing Sheets

(56) References Cited

U.S. PATENT DOCUMENTS

2014/0001874 A1 1/2014 Nahidipour
2015/0028688 A1* 1/2015 Masaoka .................. H02J 17/00
　　　　　　　　　　　　　　　　　　　　　　307/104

* cited by examiner

| Operational States | Common Mode (Capacitive) | Differential Mode (Capacitive) | Inductive Mode |
|---|---|---|---|
| Operational State 1 | ON | OFF | OFF |
| Operational State 2 | OFF | ON | OFF |
| Operational State 3 | OFF | OFF | ON |
| Operational State 4 | ON | ON | OFF |
| Operational State 5 | OFF | ON | ON |
| Operational State 6 | ON | OFF | ON |
| Operational State 7 | ON | ON | ON |
| Operational State 8 | OFF | OFF | OFF |

FIG. 8

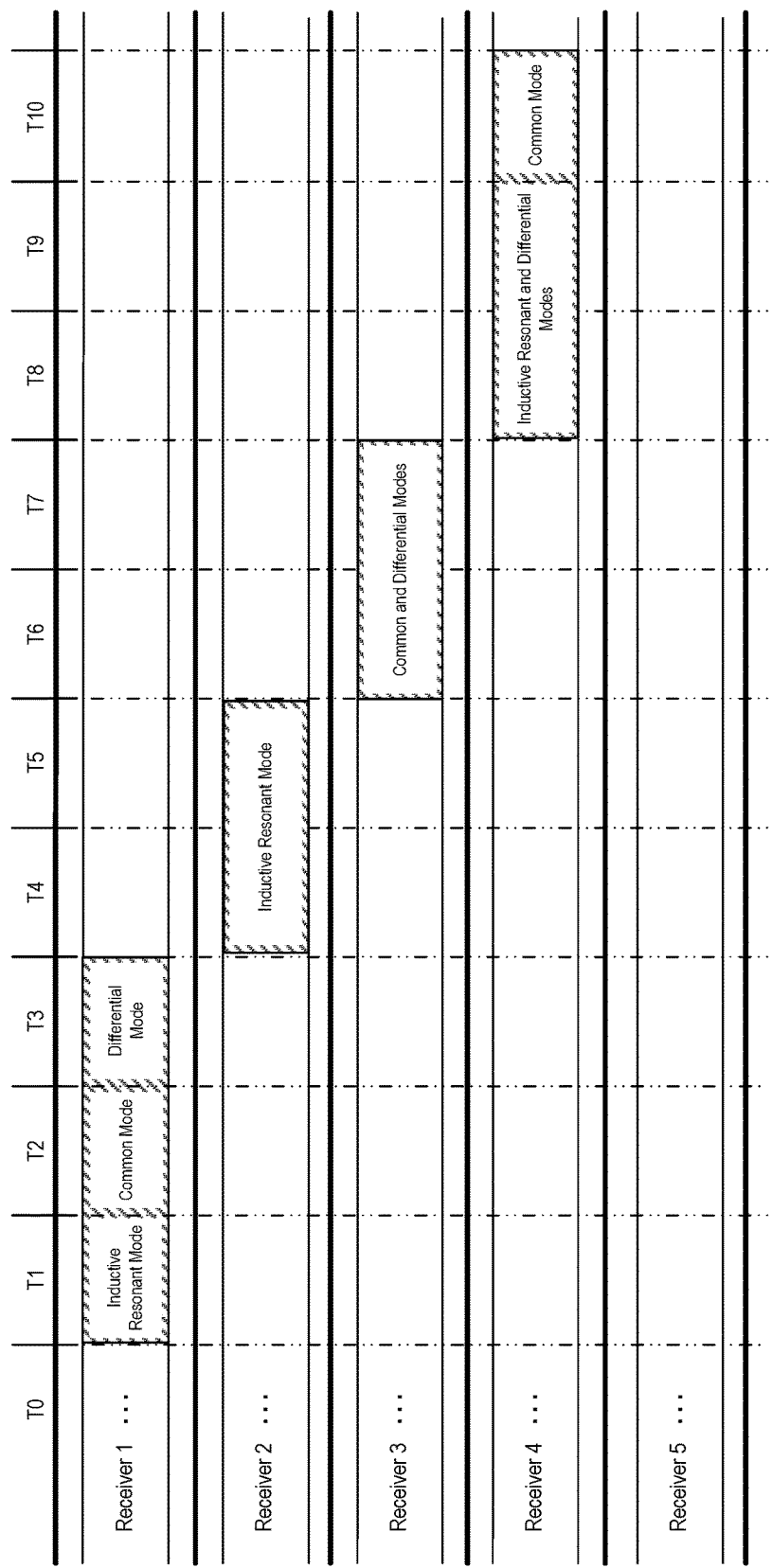

Resultant Wave at Time A: ─────────────

Resultant Wave at Time B:

Resultant Wave at Time C:

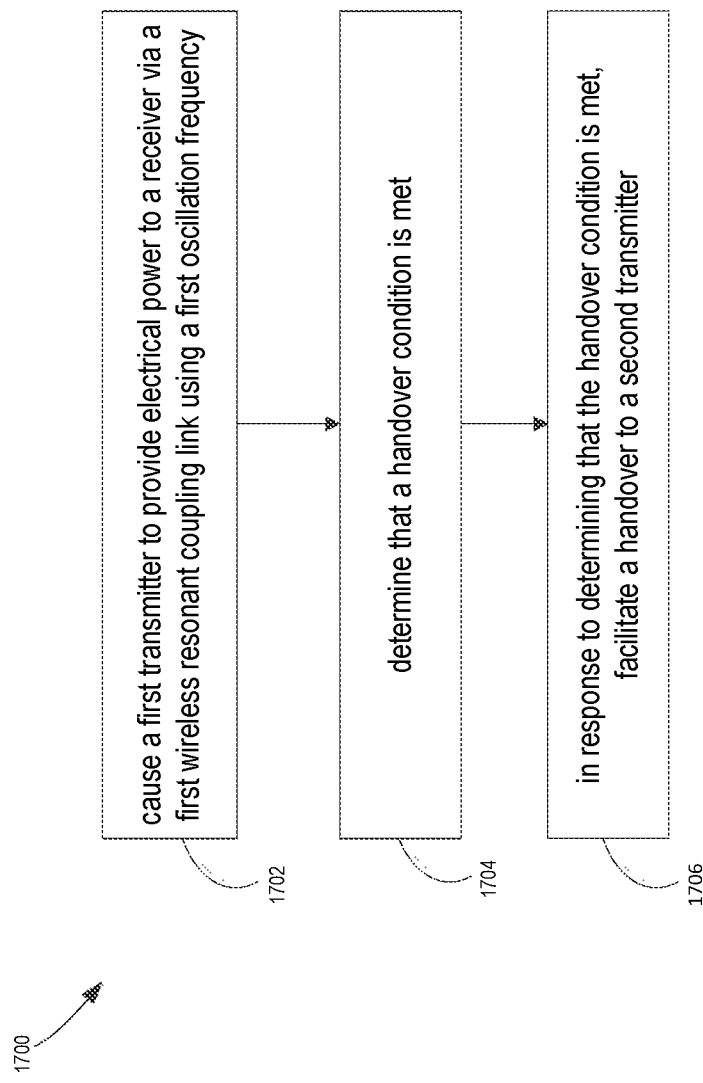

DEVICE HANDOVER

BACKGROUND

Electronic devices, such as mobile phones, laptops, and tablets, have become an integral part of daily life. Other machines, such as cars, which have conventionally used non-electric power sources, are increasingly relying on electricity as a power source. As electronic devices are often mobile, it may not be feasible for devices to stay connected to a power source via wires. Thus, electronic devices may use batteries to supply electric power when a device is not coupled to a fixed power source.

Current battery technology, however, often does not meet the charge capacity and/or discharge rate demands of electronic devices, which may limit the range of moveable devices. Even in cases where batteries meet the power demands of a given device, such a device usually must be coupled to a fixed charging source via wires in order to recharge its battery. Such wired charging mechanisms may limit the movement, and thus the usability, of the device while it is being charged. Also, as the number of devices connected to a charging source increases, the number of wires in the proximity of an electrical outlet may increase, causing "cord clutter."

SUMMARY

Example implementations may relate to a handover of a receiver from a first transmitter of a wireless power transmission system to a second transmitter of the wireless power transmission system. In particular, the receiver may initially receive electrical power from the first transmitter over a wireless resonant coupling link. While the receiver receives electrical power from the first transmitter, a controller (e.g., of the receiver and/or of the wireless power transmission system) may determine that a handover condition is met, which may serve as an indication to the controller that the first transmitter should no longer provide electrical power to the receiver and perhaps also that the second transmitter is a candidate to provide electrical power to the receiver. Consequently, the controller may respond to determining that the handover condition is met by facilitating the handover.

In accordance with the present disclosure, the controller may take steps during the handover to help minimize destructive interference as well as to minimize disruption in wireless reception of electrical power by the receiver. In particular, the controller may engage in a phase-determination process to determine first and second phases at which the first and second transmitters should respectively provide electrical power to the receiver so as to minimize the extent of decrease, due to destructive interference, of power available to the receiver. Once determined, the controller may cause the first and second transmitters to both provide electrical power to the receiver and do so respectively at the first and second phases, thereby minimizing destructive interference. Subsequently, the controller may complete the handover by causing the first transmitter to no longer provide electrical power to the receiver and by causing the second transmitter to continue to provide electrical power to the receiver. In this way, the controller effectively transitions the receiver from the first transmitter to the second transmitter such that the receiver receives electrical power with minimal disruption.

In one aspect, a method is provided. The method may involve causing a first transmitter to provide electrical power to a receiver via a first wireless resonant coupling link using a first oscillation frequency. The method may also involve determining that a handover condition is met. The method may additionally involve, in response to determining that the handover condition is met, facilitating a handover to a second transmitter. The handover includes engaging in a phase-determination process to determine a first phase at which the first transmitter should provide electrical power to the receiver and a second phase at which the second transmitter should provide electrical power to the receiver. The handover also includes causing the first transmitter to provide electrical power to the receiver at the determined first phase while also causing the second transmitter to provide electrical power to the receiver at the determined second phase, where the second transmitter provides electrical power to the receiver at the determined second phase via a second wireless resonant coupling link using a second oscillation frequency. The handover further includes, after causing the first transmitter to provide electrical power to the receiver at the determined first phase while causing the second transmitter to provide electrical power to the receiver at the determined second phase, causing the first transmitter to no longer provide electrical power to the receiver and causing the second transmitter to continue to provide electrical power to the receiver.

In another aspect, a wireless power transmission system is provided. The wireless power transmission system may include a first transmitter, a second transmitter, and a controller. The controller is configured to cause the first transmitter to provide electrical power to a receiver via a first wireless resonant coupling link using a first oscillation frequency, to determine that a handover condition is met, and, in response to determining that the handover condition is met, facilitate a handover to the second transmitter. The handover includes engaging in a phase-determination process to determine a first phase at which the first transmitter should provide electrical power to the receiver and a second phase at which the second transmitter should provide electrical power to the receiver. The handover also includes causing the first transmitter to provide electrical power to the receiver at the determined first phase while also causing the second transmitter to provide electrical power to the receiver at the determined second phase, where the second transmitter provides electrical power to the receiver at the determined second phase via a second wireless resonant coupling link using a second oscillation frequency. The method further includes, after causing the first transmitter to provide electrical power to the receiver at the determined first phase while causing the second transmitter to provide electrical power to the receiver at the determined second phase, causing the first transmitter to no longer provide electrical power to the receiver and causing the second transmitter to continue to provide electrical power to the receiver.

In yet another aspect, a wireless power receiver is provided. The wireless power receiver may include at least one receive resonator that is configured to resonate at one or more oscillation frequencies and that is operable to be coupled to one or more transmit resonators respectively via one or more wireless resonant coupling links. The wireless power receiver may also include one or more processors, a non-transitory computer readable medium, and program instructions stored on the non-transitory computer readable medium and executable by the one or more processors. In particular, the program instructions may be executable to cause the at least one receive resonator to receive electrical power from a first transmit resonator of a wireless power transmission system. The program instructions may also be executable to engage in a phase-determination process during a handover of the at least one receive resonator to a second transmit resonator of the wireless power transmission system, where the phase-determination process is to determine a first phase at which the first transmit resonator should provide electrical power to the at least one receive resonator during the handover and a second phase at which the second transmit resonator should provide electrical power to the at least one receive resonator during the handover, where the at least one receive resonator no longer receives electrical power from the first transmit resonator after the handover, and where the at least one receive resonator continues to receive electrical power from the second transmit resonator after the handover.

In yet another aspect, another system is provided. The system may include means for causing a first transmitter to provide electrical power to a receiver via a first wireless resonant coupling link using a first oscillation frequency. The system may also include means for determining that a handover condition is met. The system may additionally include means for, in response to determining that the handover condition is met, facilitating a handover to a second transmitter. The handover may include engaging in a phase-determination process to determine a first phase at which the first transmitter should provide electrical power to the receiver and a second phase at which the second transmitter should provide electrical power to the receiver. The handover may also include causing the first transmitter to provide electrical power to the receiver at the determined first phase while also causing the second transmitter to provide electrical power to the receiver at the determined second phase, where the second transmitter provides electrical power to the receiver at the determined second phase via a second wireless resonant coupling link using a second oscillation frequency. The handover may additionally include, after causing the first transmitter to provide electrical power to the receiver at the determined first phase while causing the second transmitter to provide electrical power to the receiver at the determined second phase, causing the first transmitter to no longer provide electrical power to the receiver and causing the second transmitter to continue to provide electrical power to the receiver.

In yet another aspect, yet another system is provided. The system may include means for causing at least one receive resonator to receive electrical power from a first transmit resonator of a wireless power transmission system. The system may also include means for engaging in a phase-determination process during a handover of the at least one receive resonator to a second transmit resonator of the wireless power transmission system, where the phase-determination process is to determine a first phase at which the first transmit resonator should provide electrical power to the at least one receive resonator during the handover and a second phase at which the second transmit resonator should provide electrical power to the at least one receive resonator during the handover, where the at least one receive resonator no longer receives electrical power from the first transmit resonator after the handover, and where the at least one receive resonator continues to receive electrical power from the second transmit resonator after the handover.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8 is a table illustrating modes of operation of a system, according to an example embodiment.

FIG. 9A to 9B illustrate a TDMA wireless resonant coupling channel, according to an example embodiment.

FIG. 17 illustrates a method to facilitate handover of a receiver from a first transmitter to a second transmitter, according to an example embodiment.

DETAILED DESCRIPTION

Figure 1:
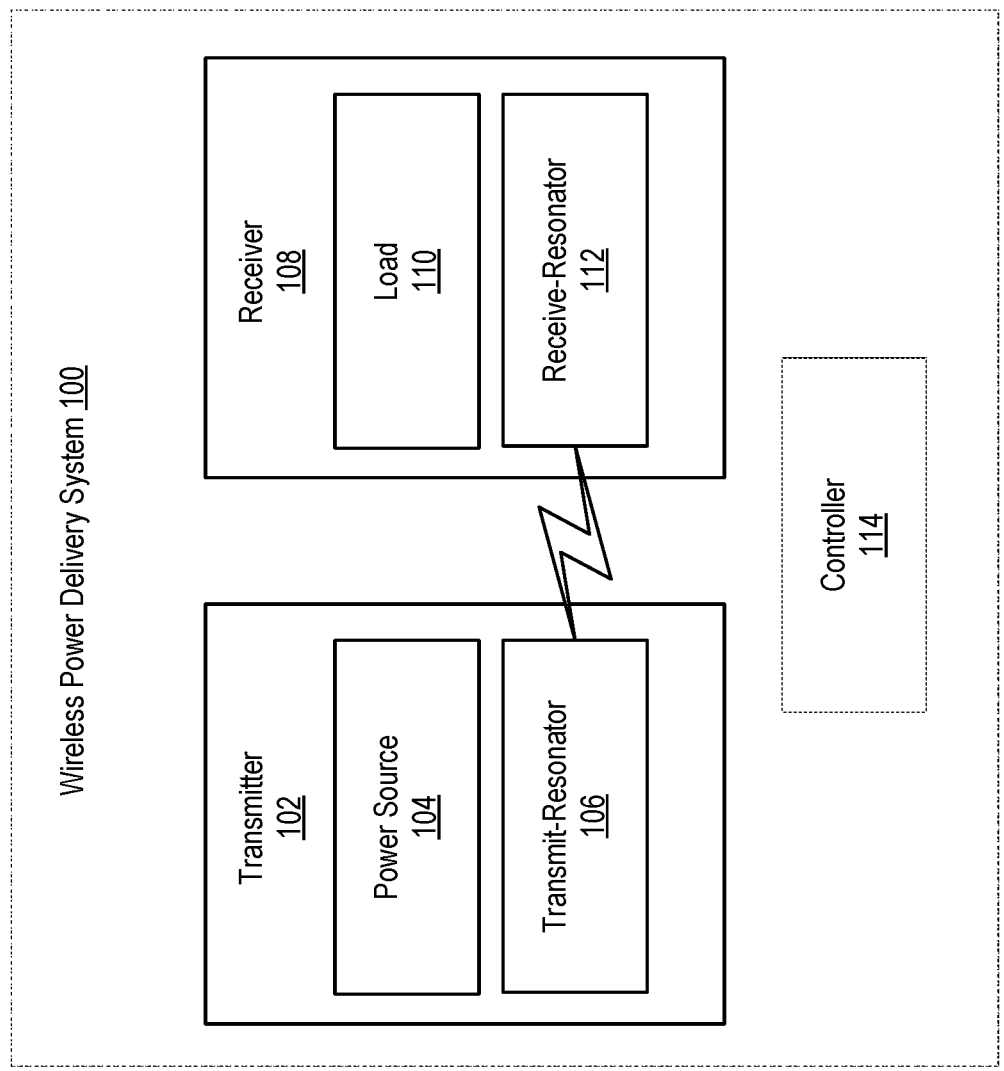
FIG. 1 is a functional block diagram illustrating the components of a wireless power delivery system, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Furthermore, the term "capacitor" as used herein should be understood broadly as any system, including one or more elements, with a capacitive property. As such, the term "capacitor" may be used to refer to a lumped capacitive element and/or to a distributed capacitive element. Similarly, the term "inductor" as used herein should be understood broadly as any system, including one or more elements, with an inductive property. As such, the term "inductor" may be used to refer to a lumped inductive element and/or to a distributed inductive element.

I. Overview

Example implementations relate to a wireless power system in which electrical power can be transmitted wirelessly from a transmitter to a receiver. In an example embodiment, the transmitter and the receiver may each include at least one resonator. Also, each such resonator may be configured to resonate at at least one oscillation frequency. In such a scenario, the transmitter and the receiver could be resonantly coupled via a wireless resonant coupling link, and thus the transmitter could provide power to the receiver via the wireless resonant coupling link using the oscillation frequency. Moreover, the transmitter and the receiver may be configured to engage in communications via a side-channel communication link, so as to share information about the receiver's power demand and/or the extent of power being transmitted, among other possibilities.

Further, the magnitude of coupling between the transmitter and the receiver can be represented by a coupling factor k, which is a dimensionless parameter that represents the fraction of flux coupling the transmitter and the receiver. The coupling factor k can be calculated based on parameters of the wireless power system, which may include forward power that is transmitted by the transmitter, reflected power that is reflected from the receiver, impedances of elements of the system, etc.

With this arrangement, the wireless power system may be configured to wirelessly transfer a specified amount or rate of power from the transmitter to the receiver via the wireless resonant coupling link. For instance, a controller of the system may configure the operating parameters of the system such that the transmitter transfers the specified amount of power to the receiver. Moreover, the specified amount of power at issue may be based on the receiver's power demand, among other options.

In some situations, a receiver need not (or may no longer) receive information about an extent of power that meets the receiver's power demand. For example, the coupling between the transmitter and the receiver may become weaker as the distance between the transmitter and the receiver increases. And when the coupling becomes weaker, the power transmission efficiency may decrease, thereby causing the receiver to receive less power. Given this situation, the receiver's power demand could be met when the receiver is initially at a first distance away from the transmitter. But the receiver may then move to a new location at which the receiver is then at a greater second distance away from the transmitter. As a result, the coupling may weaken and thus the receiver's power demand may no longer be met. Other example situations are also possible.

To address this problem, disclosed herein are methods and systems to initiate and ultimately facilitate a handover of the receiver to a new transmitter that could help meet the receiver's power demand. In some embodiments, any feasible combination of entities could carry out the disclosed operations. For example, any one of a receiver, one or more transmitters, and/or a controller may carry out any one of the operations described herein. Such entities may engage in communications with one another so as to obtain information from one another and/or so as to cause one another to perform certain operations. For simplicity, however, the present disclosure will generally be described herein in the context of the controller carrying out the operations.

In accordance with the disclosure, the controller may cause a first transmitter to provide electrical power to a receiver via a first wireless resonant coupling link. The controller may then determine that a handover condition is met, which may indicate to the controller that the first transmitter should no longer provide power to the receiver and that a second transmitter is a candidate to provide electrical power to the receive resonator. Once the controller determines that the handover condition is met, the controller may then responsively facilitate the handover, which may be carried out in a manner that helps minimize disruptions and/or destructive interference during the handover.

In particular, the controller may carry out a phase-determination process to determine a first phase and a second phase at which the first and second transmitters should respectively provide electrical power to the receiver at substantially the same time. As part of the phase-determination process, phases may be determined that help minimize destructive interference between the separate power transmission signals and thus that may minimize extent of decrease of power available to the receiver, among other possibilities. As such, the controller may then cause the first and second transmitter to both provide electrical power to the receiver at substantially the same time and do so respectively at the first and second phases. Then, the controller may complete the handover by causing the first transmitter to no longer provide electrical power to the receiver and by causing the second transmitter to continue to provide electrical power to the receiver.

II. Example Wireless Power System

An example system 100 for wireless transfer of power is shown in FIG. 1. The system 100 may include various subsystems, elements, and components as described below. One or more subsystems may include a controller configured to carry out one or more of a variety of operations. In accordance with example embodiments, a controller may include one or more processors, memory, and machine language instructions stored in the memory that when executed by the one or more processors cause the controller to carry one or more of its controlling functions or operations. A controller may also include one or more interfaces for device control, communications, etc.

In further accordance with example embodiments, various functions and operations described below may be defined as methods that may be carried within the system, where at least some aspects of the methods can be implemented based on functions and/or operations carried out by one or more controllers and/or one or more of processors. Other aspects of the methods may be carried out by other elements or components of the system, under control of one or another controller, in response to environmental factors, or in response to receiving or detecting a signal, for example.

In an example embodiment, a wireless power delivery system may include a power source configured to wirelessly deliver power to a load via a transmitter and a receiver. As shown in FIG. 1, system 100 may include a transmitter 102 and a receiver 108, both of which may be considered subsystems of system 100, and a controller 114. For the sake of brevity in FIG. 1 and elsewhere herein, control functions and operations are generally described as being carried out only by the controller 114. Thus, controller 114 may be viewed conceptually as a unified control function. It should be understood, however, that as subsystems of system 100, the transmitter 102 and receiver 108 may each include its own controller, as described elsewhere herein. Alternatively or additionally, the controller 114 may include a distributed computing system, e.g., a mesh network.

As such, the various control functions and operations attributed to controller 114 may be implemented across one or more controllers, such as ones included (but not shown) in transmitter 102 and receiver 108. For example, an operation described as being carried out by the transmitter could be done so under control of a controller in the transmitter. Similarly, an operation described as being carried out by the receiver could be done so under control of a controller in the receiver.

In addition to each of the transmitter 102 and receiver 108 possibly including its own controller, each of them may also include and/be constructed of various types of electrical components. For example, electrical components may include circuit elements such as inverters, varactors, amplifiers, rectifiers, transistors, switches, relays, capacitors, inductors, diodes, transmission lines, resonant cavities, and conductors. Furthermore, the electrical components may be arranged in any viable electrical configuration, such as lumped or distributed.

Returning to FIG. 1, the transmitter 102 of system 100 may include a transmit-resonator 106. The transmit-resonator 106 may have a high Q value and may be configured to resonate at one or more resonant frequencies. Transmitter 102 may be coupled with power source 104, which may be configured to supply transmit-resonator 106 with a signal oscillating at one of the transmit-resonator resonant frequencies. In an example, the power source 104 may include a power oscillator to generate the oscillating signal, which may be oscillating at one of the transmit-resonator resonant frequencies. The power oscillator may be powered by a power signal received from an electrical outlet. For example, the electrical outlet may supply the power source 104 with an AC voltage of 120 V at a frequency of 60 Hz. In other examples, the power source may include a converter that may use a power from a power signal, which may have a low-frequency (i.e. 60/50 Hz), to generate a carrier signal that has an oscillation frequency of one of the transmit-resonant frequencies. The carrier signal may be modulated to carry the power signal and may thus be the oscillating signal supplied by the power source 104.

Furthermore, the resonant frequency $\omega_0$ at which the signal may oscillate, also called the system resonant frequency, may be chosen by controller 114 of system 100. Transmit-resonator 106 may resonate, upon receiving the oscillating signal from source 104, and consequently, may generate a field oscillating at the system resonant frequency.

Receiver 108 may include a receive-resonator 112. The receive-resonator 112 may have a high Q value and may also be configured to resonate at the system resonant frequency. The receiver 108 may also include a load 110. Thus, if receive-resonator 112 is in the range of the oscillating field (i.e., the field penetrates receive-resonator 112), resonator 112 may wirelessly couple with the oscillating field, thereby resonantly coupling with transmit-resonator 106. Receive-resonator 112, while resonating, may generate a signal that may be delivered to the load 110. Note that in the implementation where the oscillating signal generated by the power source 104 is a modulated carrier signal (generated by a converter), the receiver 108 may include a filter network. The filter network may be used to isolate the power signal from the modulated carrier signal. The power signal (i.e., 50/60 Hz signal) may then be delivered to the load 110.

In example systems, there may be more than one receiver. This is described below in further detail.

Figure 2:
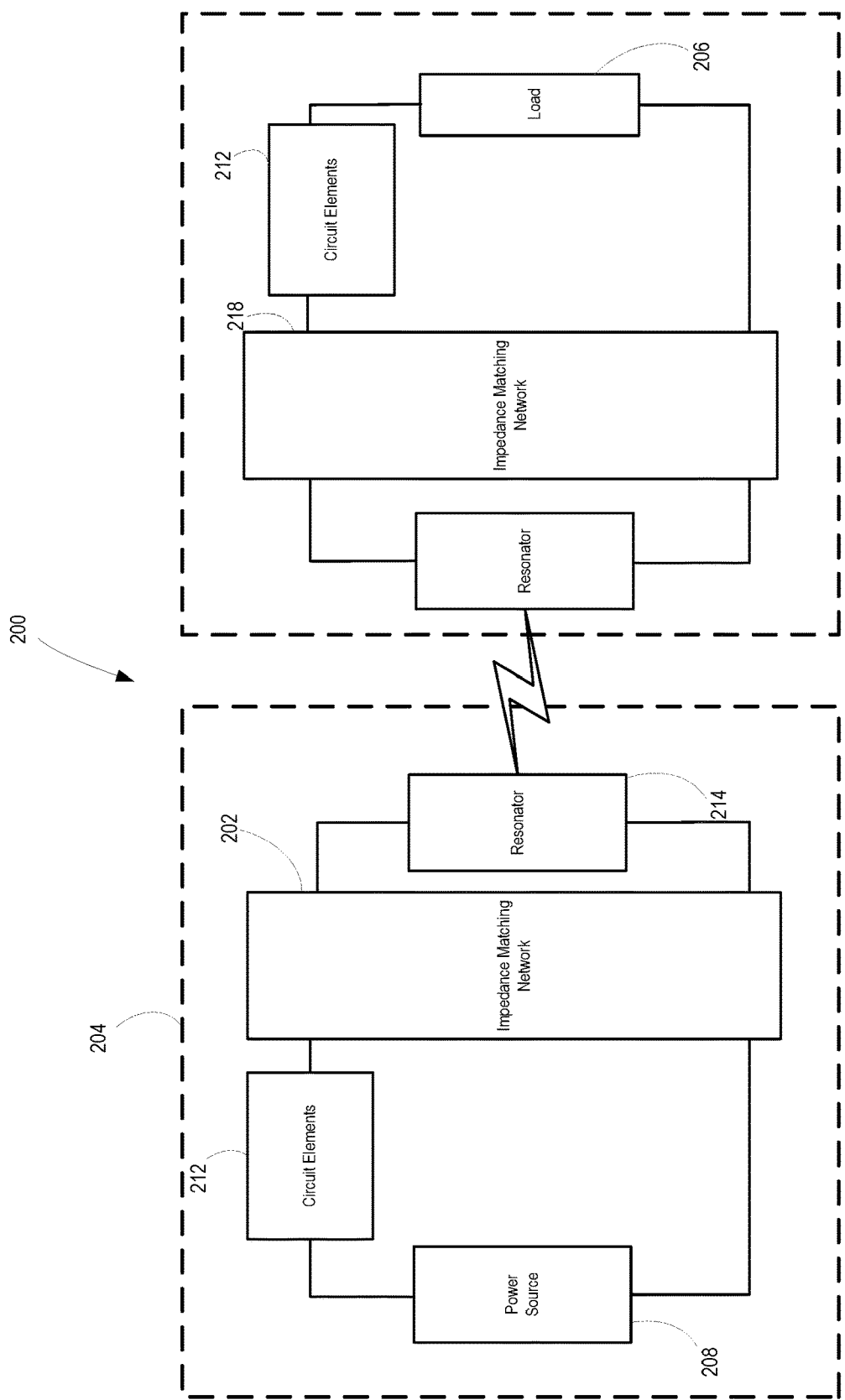
FIG. 2 is a functional block diagram illustrating an impedance matching circuit coupled to a transmitter, according to an example embodiment.

Wireless power delivery systems may include at least one impedance matching network configured to increase the efficiency of wireless power transfer. FIG. 2 illustrates an impedance matching network in a system, according to an exemplary embodiment. As illustrated in FIG. 2, the impedance matching network 202 is coupled to the transmitter 204. Further, the impedance matching network 202 may be in series, parallel, or in any other configuration with the transmit-resonator 214. In some embodiments, an impedance matching network 218 may additionally and/or alternatively be coupled to the receiver. Furthermore, the impedance matching networks 202 and 218 may each include any combination of L matching networks, pi networks, T networks, and/or multi-section matching networks.

In some embodiments, the system may deliver a determined power to the load by configuring the impedance matching network to operate at a determined impedance. In particular, a controller of the system may determine a power to deliver from the transmitter to the load. The controller may use at least the reflected impedance, from the load to the transmitter, to determine the impedance that the impedance matching network(s) may be configured to match. Accordingly, the system may deliver the determined power to the load when the impedance matching network matches the determined impedance.

More specifically, the controller of the system may generate a model, such as a SPICE model, of the system to determine the impedance that the impedance matching network may match. The model may include known values such as the actual impedance of the load, which the controller may receive from the receiver using methods described herein. However, the controller may need to determine the actual power supplied to the load from the transmitter and the reflected impedance (from the load to the transmitter) in order to fully characterize the model of the system (e.g., to derive the coupling factor k). The controller may use the fully characterized model of the system to dynamically impedance match by precisely determining the impedance that the impedance matching circuit may match.

In an embodiment, the system may include a bidirectional coupler, which may be used to determine the actual power supplied to the load from the transmitter and the reflected impedance from the load to the transmitter. The bidirectional coupler may be used in conjunction with a computer and/or a controller to precisely solve for an impedance of the load connected to it. The bidirectional coupler may also be used, in conjunction with a computer and/or a controller, to precisely solve for the amount power leaving the power source. The value of the reflected impedance of a load and the amount power leaving the source may be used to adjust the impedance matching network. Accordingly, the system may be configured to dynamically impedance match in a single step by using the bidirectional coupler to determine the actual power supplied by the source and the reflected impedance from the load to the transmitter.

However, the value of the reflected impedance from the load may change due to different factors, such as a change in the coupling between a transmitter and a receiver. The coupling between a transmitter and a receiver may change due to various factors, such as a change in the distance between the transmitter and the receiver. For example, the receiver may move during power transfer, which may change the coupling between the transmitter and the receiver. Such relative movement may change the reflected impedance of the load. Accordingly, as the reflected impedance from the load to the transmitter changes, the controller may be configured to continuously or intermittently solve for the actual power delivered to the load and the reflected load impedance, in order to dynamically impedance match.

Figure 3:
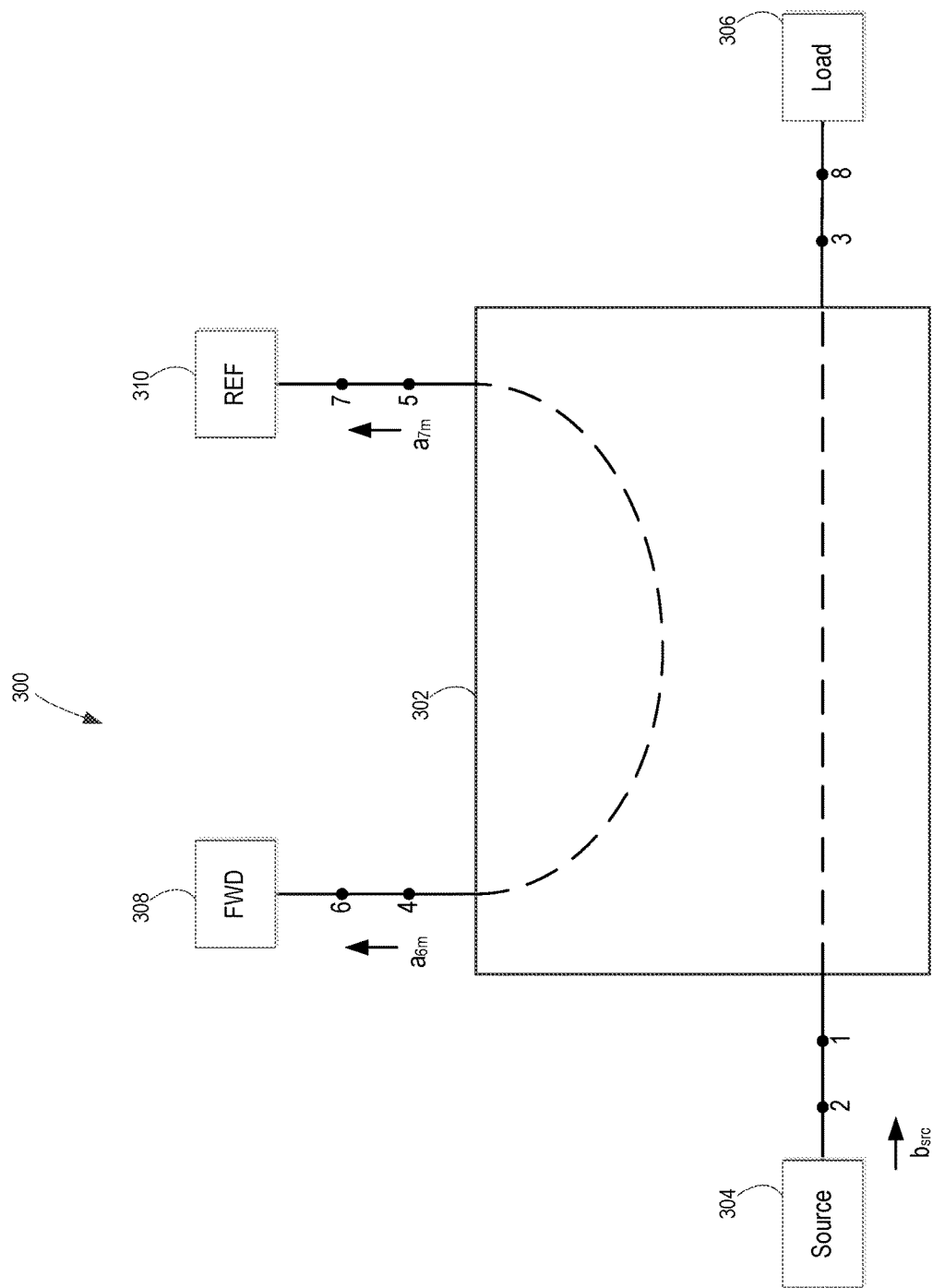
FIG. 3 is a diagram illustrating a representation of a bidirectional coupler used in a mathematical derivation, according to an example embodiment.

FIG. 3 illustrates a network representation of a system, including the bidirectional coupler 302 that is coupled in cascade between a power source 304 and a load 306, according to an exemplary embodiment. As illustrated in FIG. 3, the bidirectional coupler may be coupled between the power source at port 2 and the rest of the system (lumped into load 306) at port 8. Generally, there may be forward and reflected power waves at each port of the bidirectional coupler (ports 1, 3, 4, and 5). The forward and reflected waves, and thus the power and impedance, at each port, may be precisely determined by fully characterizing the RF properties of the bidirectional coupler. For instance, a mathematical relationship between the incoming and outgoing waves on each of the bidirectional coupler 302's ports may be used to precisely calculate the power delivered to the load 306 and the load 306's reflected impedance back to the source 304. The mathematical relationship may use an S-parameter characterization of the bidirectional coupler 302 to relate between the incoming and outgoing waves on each of the bidirectional coupler 302's ports.

The bidirectional coupler 302 may operate by coupling forward power from port 1 to port 3. An attenuated forward power may be coupled to port 4 and sampled at measurement FWD port 6. Additionally, a small amount of forward power may also be coupled into port 5 and measured at REF port 7. Likewise, reflected power is coupled from port 3 to port 1, and an attenuated power may be coupled to port 5 and sampled at measurement REF port 7. Additionally, a small amount of reflected power may be coupled into port 4 and measured at FWD port 6. Despite these non-idealities, of the forward power coupling to port 5 and the reflected power coupling to port 4, a computer and/or a controller may precisely calculate the power delivered to the load 306 and the load 306's reflected impedance. The controller may use premeasured values and values measured in real-time in order to solve for the unknown values of the mathematical relationship between the reflected power waves, the incident power waves, and the bidirectional coupler's S-parameter matrix.

The premeasured values of the mathematical relationship (A) may include a 4×4 S-parameter matrix and the input reflection coefficient, an S-parameter, of power source 302. Further, the non-idealities in the operation of the bidirectional coupler may be accounted for by premeasuring the 4×4 S-parameter matrix of the bidirectional coupler 302. In some embodiments, the S-parameters may be premeasured using a vector network analyzer (VNA). The measured S-parameters may be stored in a lookup table that a controller of system 300 may have access to.

Further, as explained above, the bidirectional coupler 302 may be used to periodically make real-time measurements of waves that may be used to solve for the power delivered to the load 306 and the load 306's reflected impedance. Specifically, in order to precisely calculate the power delivered to the load 306 and the load 306's reflected impedance, both the absolute magnitude of the power signals at ports 6 and 7 may be measured along with the phase of each signal with respect to the other. FWD and REF may include any measurement device or circuitry capable of measuring signals, e.g., an ammeter, a voltmeter, a spectrum analyzer, etc. Furthermore, FWD and REF may send information indicative of the respective measured signals to the controller of the system.

Furthermore, certain configurations of network 300 may simplify the S-parameter characterization of the bidirectional coupler 302. By design, FWD 308 and REF 310 may be impedance matched to the transmission line that carries the signals to each port to prevent signals from reflecting when measured at each port. For example, FWD port 308 and REF port 310 may be 50Ω terminated when a transmission line that has characteristic impedance ($Z_0$) of 50Ω is used to carry the signal to each port.

Accordingly, a controller of a wireless power delivery system may use a bidirectional coupler to solve for the reflected impedance of the load and the power delivered to the load. The system may use the solved for values in the model of the system to fully characterize the system. As such, at least the coupling factor k may be calculated. Further, the controller may use the model of the system to predict the amount of power that may be delivered to a load by adjusting the impedance that the impedance matching circuit may match.

Further, the controller may periodically measure the reflected impedance of the load and the power delivered to the load, according to a predetermined time period, which may range from microseconds to tens of seconds in length. After each measurement, the controller may periodically adjust at least one impedance matching network of the system. In an example, a controller may measure the reflected impedance and may accordingly adjust an impedance matching network every millisecond using the method described above. Other time intervals are possible. Alternatively, the controller may measure the reflected impedance of the load and the power delivered to the load continuously. In such a scenario, the controller may continuously adjust an impedance matching network of the system to deliver a determined power to the load.

In some embodiments, the wireless power delivery system may include a plurality of receivers coupled to a single transmitter with a single bidirectional coupler. In such a scenario, each receiver may reflect a signal to the transmitter due to a possible impedance mismatch at each load coupled to each receiver. The controller may use the measured values to fully characterize the system in order to determine an impedance that the impedance matching network may match.

In some embodiments, a plurality of receivers may be coupled to a single bidirectional coupler. The bidirectional coupler may use time-division multiplexing (TDM) to send the reflected signal of each receiver to the measurement device during a given interval of time. The controller may then use the method described above to solve for the reflected impedance of each load coupled to each respective receiver.

The controller of the system may adjust at least one impedance matching circuit based on the measured values. In an example embodiment, a system with a plurality of receivers may include an impedance matching network coupled to the transmitter and/or to each of the receivers. However, as the transmitter may receive different reflected impedances from each load, it may not be possible for the controller to adjust the impedance matching network to simultaneously match the reflected impedance of each receiver and the impedance of the power source. Accordingly, in some embodiments, the controller may adjust at least one impedance matching network of the impedance matching networks coupled to each of the receivers. In other embodiments, the controller may adjust the impedance matching network, coupled to the transmitter, to match the reflected impedance of a selected receiver from the plurality of receivers. As such, the selected receiver, whose reflected impedance was matched at the impedance matching network, may proportionately receive more power than the other receivers in the system. In some embodiments, wireless power delivery to the selected receiver may be more efficient than such power delivery to other receivers of the plurality of receivers.

In other examples, a system with a plurality of receivers may perform impedance matching according to time-division (TDM) and/or frequency-division (FDM) multiplexing. For instance, in a TDM scheme, each receiver may be configured to couple to the transmitter with a single impedance matching network during a specific time interval. The system may receive a reflected signal from a receiver during the specific time interval that the receiver is coupled to the transmitter. In such a scenario, the controller may adjust the impedance matching network such that each receiver may receive maximum power during the interval that the receiver is coupled to the transmitter. In an example embodiment, each receiver of the plurality of receivers may be assigned a respective time slot according to a receiver priority or a receiver order. The time slots may be equal in duration, but need not be equal. For example, receivers with higher receiver priority may be assigned to longer time slots than those receivers with a lower receiver priority.

In a FDM scheme, each receiver may be configured to couple to the transmitter with on a specific respective frequency. The system may receive a respective reflected signal from each receiver on the specific frequency that the receiver is coupled to the transmitter on. In such a scenario, the controller may adjust the impedance matching network(s), which may be connected to the transmitter and/or to each of the receivers, such that each receiver may receive a determined amount of power.

In yet another example of a system with a plurality of receivers, a controller may determine the power that each receiver may receive simultaneously from the transmitter by adjusting the impedance matching network. Specifically, the impedance of the impedance matching network may determine, at least in part, the amount of power that each receiver may receive. For example, each receiver may receive power based on at least a difference between the receiver's impedance and that of the impedance matching network. Accordingly, the controller may adjust the impedance matching network so as to increase or decrease an amount of power delivered to a respective receiver, based at least on the receiver's impedance.

A controller may determine the amount of power that each receiver may receive from the transmitter based on various parameters. In an example embodiment, each receiver may be associated with a respective priority such that higher priority receivers may receive more power during a single power distribution cycle than lower priority receivers. In other examples, a current charging state of the receiver (if the receiver is coupled to a load that includes a battery), may determine the amount of power that a receiver may receive. That is, a receiver with a low battery level may receive higher priority than a receiver with a full battery. It is understood that the controller may distribute power to each receiver of the plurality of receivers based on a variety of other parameters.

Within examples, a controller may receive information indicative of at least one parameter from a receiver when authenticating the receiver. As such, the controller may generate a dynamic priority list based on the received information. In an example embodiment, the dynamic priority list may be updated when a receiver connects or disconnects from a transmitter. Further, a controller may store the received information and the corresponding dynamic priority lists either locally or on a server. In other examples, a receiver may send a controller updated information if a parameter of the receiver changes after the initial synchronization process. In other examples, a controller may periodically query a receiver, via a side-channel communication link, for example, to request information regarding the state of the receiver. As such, the controller may receive, via the side channel, for example, information such as the current charging state of a battery of a receiver or the current power requirements of a receiver.

In yet other examples, a system may include one or more impedance matching networks in each receiver of the plurality of receivers. A system may additionally or alternatively include impedance matching networks in the transmitter and at least one of the receivers. In such scenarios, a controller may be configured to adjust a plurality of impedance matching networks of the system such that each receiver may receive a determined amount of power from the transmitter.

Additionally or alternatively, the system may use the dynamic impedance matching method described above to detect a parasitic receiver. Specifically, a controller of the system may use information, such as nominal impedance, about authorized receivers to generate a circuit model of at least a portion of the wireless power delivery system. Additionally or alternatively, the controller may generate the circuit model based on an approximation, estimation, or other determination of a coupling condition between the transmitter and the receiver, which may be based on their relative locations. Based on the circuit model, the controller may calculate an ideal power reception amount that it may receive from each receiver. Accordingly, the controller may compare the calculated ideal power received and the actual power received. If the ideal and actual powers received are not equal within a specified margin of error, the controller may determine that a parasitic device may be present in the system. For example, the controller may determine that a parasitic device may be present in the system if the value of the calculated power received varies by more than 10% of the value of the actual power received. Additionally or alternatively, the controller may use other methods disclosed herein to identify parasitic receivers.

A. Coupling Modes

A transmitter and a receiver of a wireless power delivery system may establish a wireless coupling resonant link, and thus become resonantly coupled, via various coupling modes. Each coupling mode is associated with a type of resonator that may be included in a transmitter and/or a receiver. Accordingly, a system may excite a type of resonator so as to provide a wireless resonant link via the associated coupling mode. Furthermore, the system may maintain multiple wireless resonant links of different coupling mode types at any given time. Within examples, a transmitter and a receiver of a system may include at least one of three resonator types. As such, the operational state of a system may utilize at least one of three resonant coupling modes.

Figure 4A:
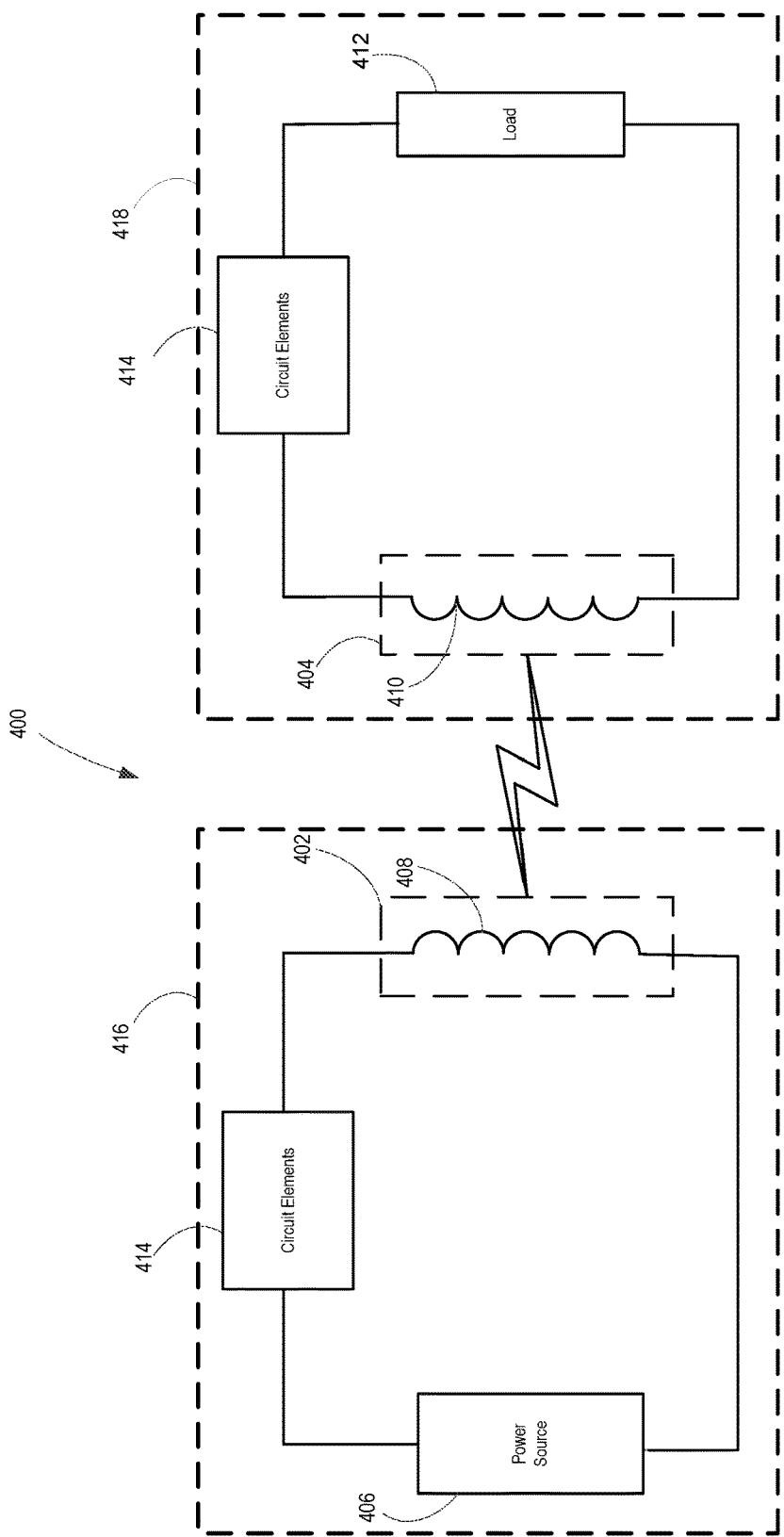
FIG. 4A to 4B illustrate a simplified circuit diagram of inductive resonant coupling, according to an example embodiment.
Figure 4B:
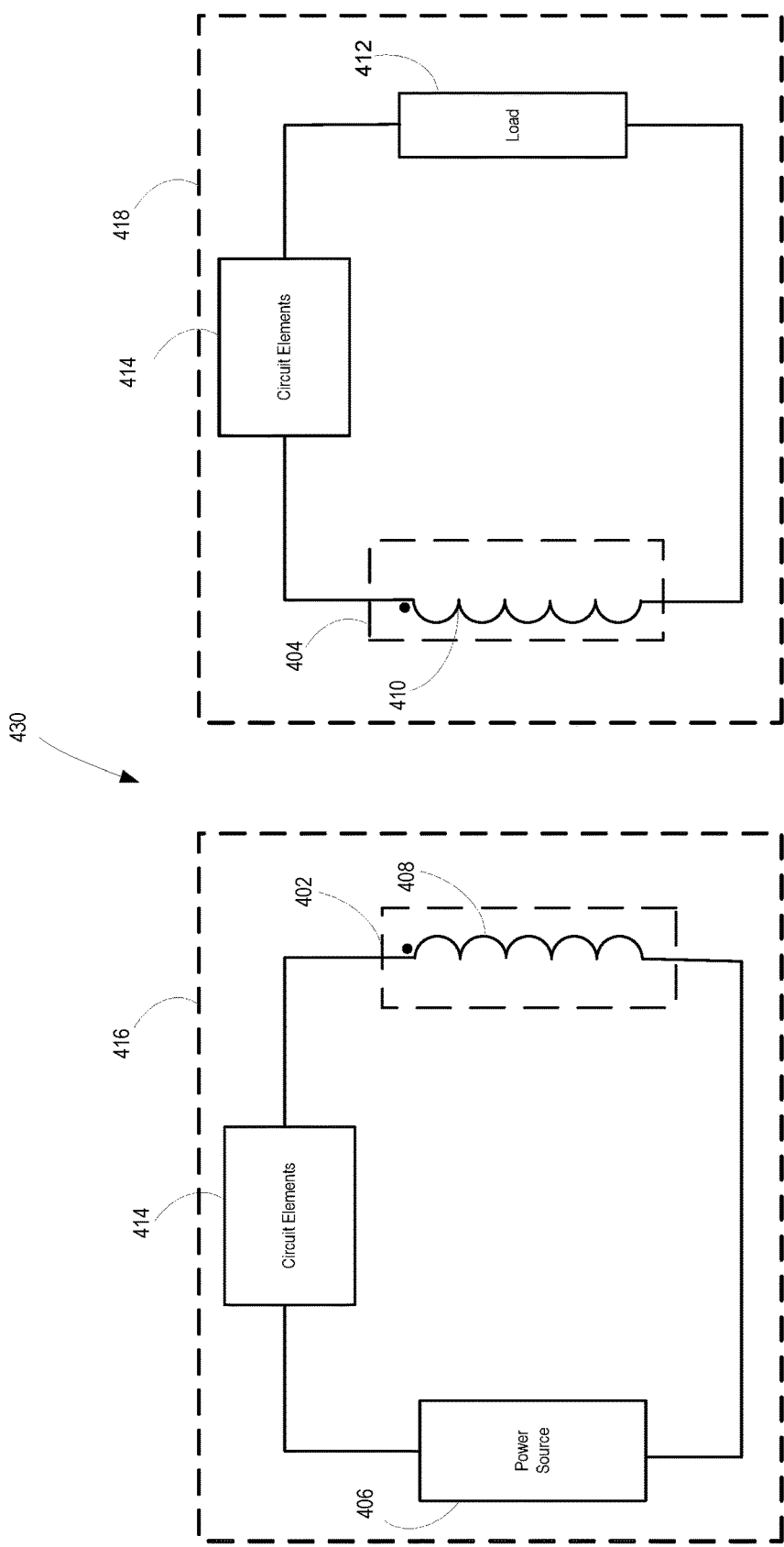

FIG. 4A and FIG. 4B illustrate an inductive resonant coupling mode, the first coupling mode, according to an exemplary embodiment. Each of transmit-resonator 402 and receive-resonator 404 may include at least an inductor. Further, each resonator may be configured to resonate at least at the system resonant frequency of system 400. Transmit-resonator 402 may resonate upon receiving a signal, from power source 406, that is oscillating at the system resonant frequency. Thus, transmit inductor 408 of transmit-resonator 402 may generate a magnetic field oscillating at the system resonant frequency. Receive-resonator 404 may couple with the oscillating magnetic field if it is within proximity to the transmit-resonator 402. As a result, a wireless coupling resonant link may be established. Coupled receive-resonator 404 may then resonate, and may therefore generate a signal that may be delivered to load 412.

Additionally or alternatively, the system may include a transmitter and/or a receiver that include a capacitive resonator, which may be operable to couple the transmitter and the receiver. In an example embodiment, each of the transmitter capacitive resonator and the receiver capacitive resonator may include at least a capacitor. The transmit-resonator may resonate upon receiving, from the power source, a signal oscillating at the system resonant frequency. As the transmit-resonator resonates, the capacitor of the transmit-resonator may generate an electric field oscillating at the system resonant frequency. The receive-resonator, if in proximity to the transmit-resonator, may couple with the oscillating electric field; thereby establishing a wireless coupling link between the transmitter and the receiver. As such, the receive-resonator may resonate, and may therefore generate a signal that may be delivered to a load coupled to the receiver.

In an example embodiment, a system may include at least one of two types of capacitive resonators, each of which may be associated with a respective coupling mode. The two capacitive resonators differ in the configuration of their respective capacitors. The first capacitive resonator may include a common mode capacitor, which may support a capacitance between a single conductor and ground. A common mode capacitive resonator may be operable to provide a wireless coupling link via a coupling mode termed common mode. The second capacitive resonator type may include a differential mode capacitor, which may support a capacitance between two conductors. A differential mode capacitive resonator may be operable to provide a wireless coupling link via a coupling mode termed differential mode.

Figure 5A:
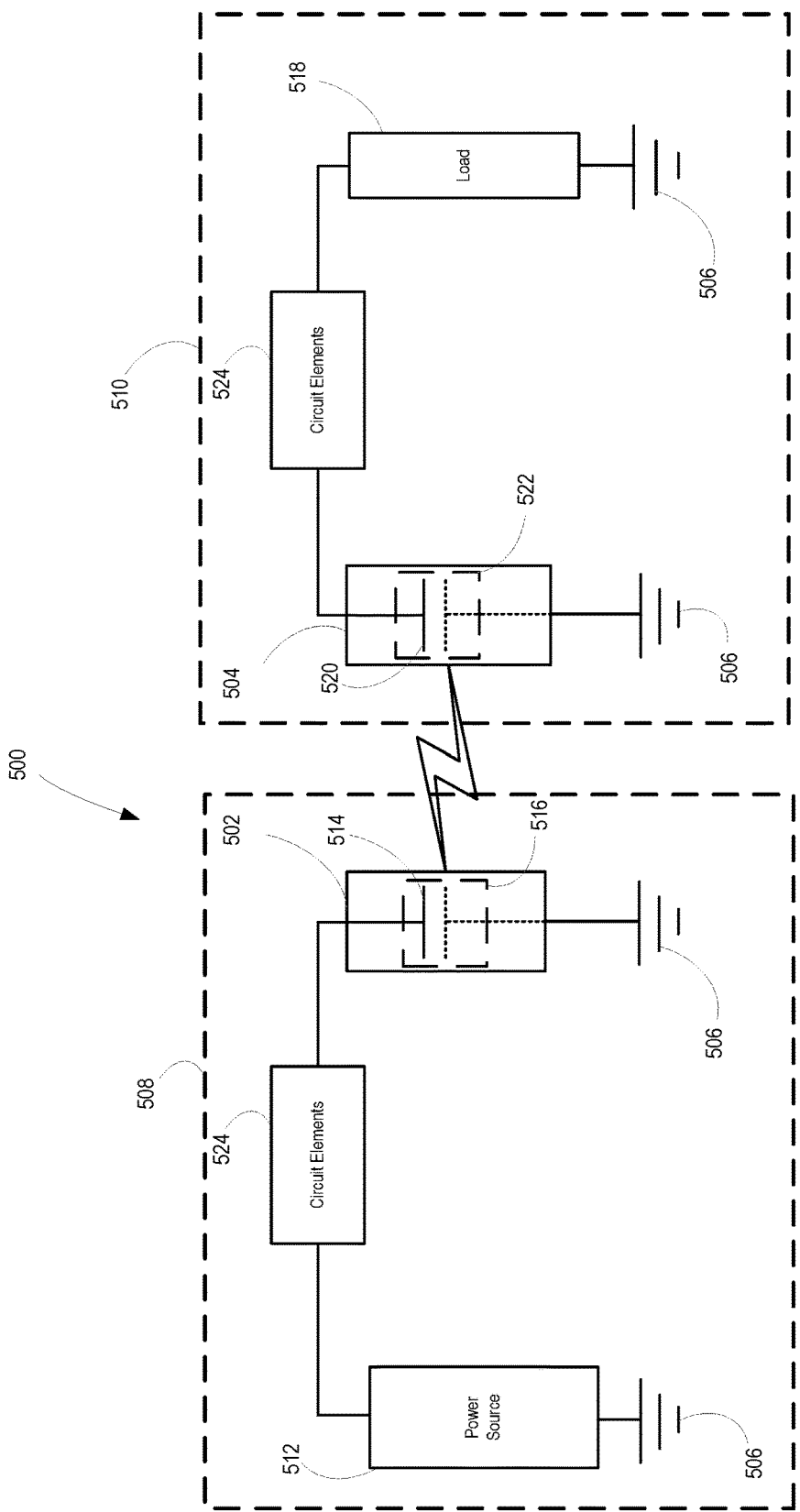
FIG. 5A to 5C illustrate a simplified circuit diagram of common mode capacitive resonant coupling, according to an example embodiment.
Figure 5B:
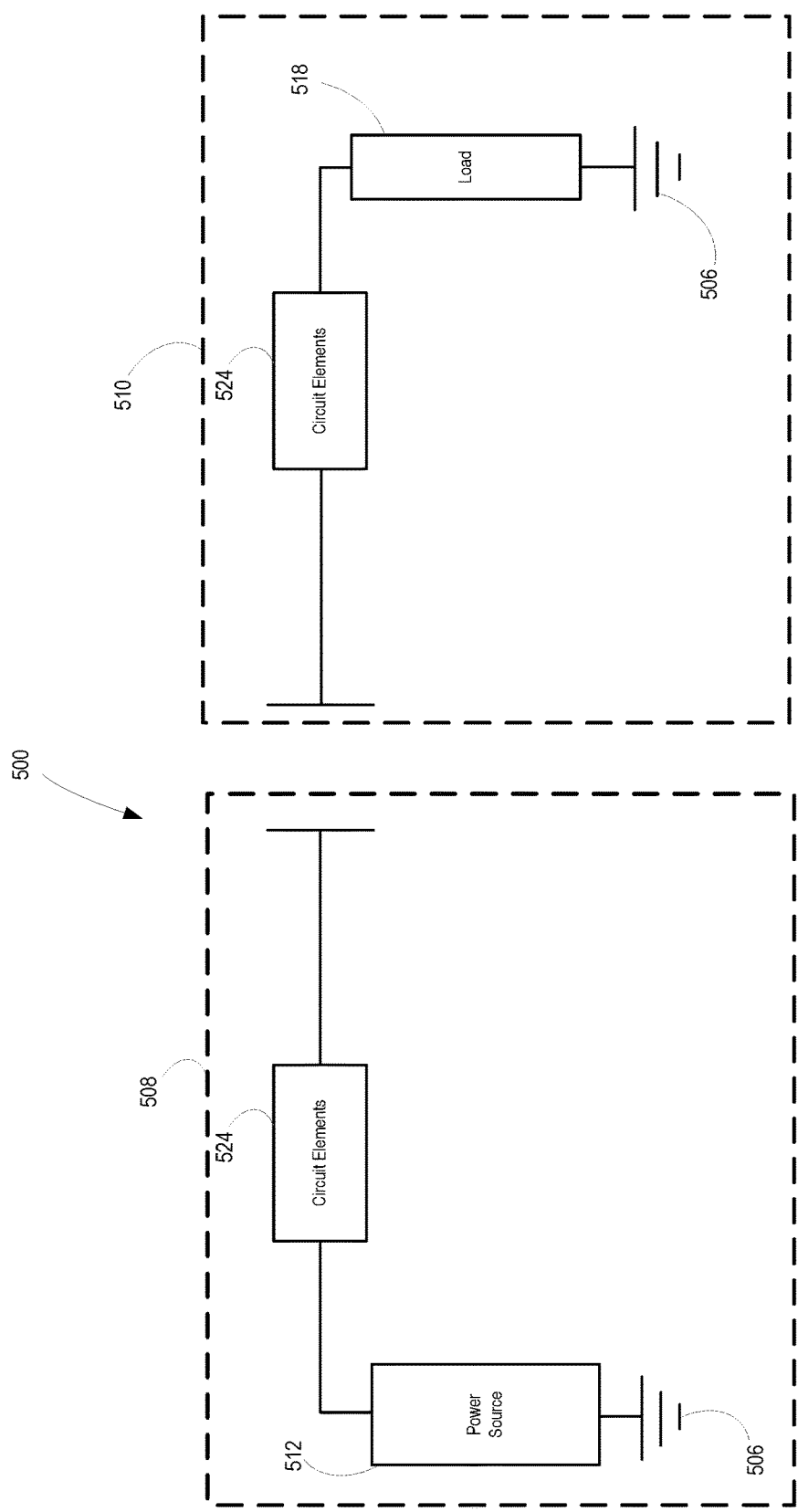
Figure 5C:
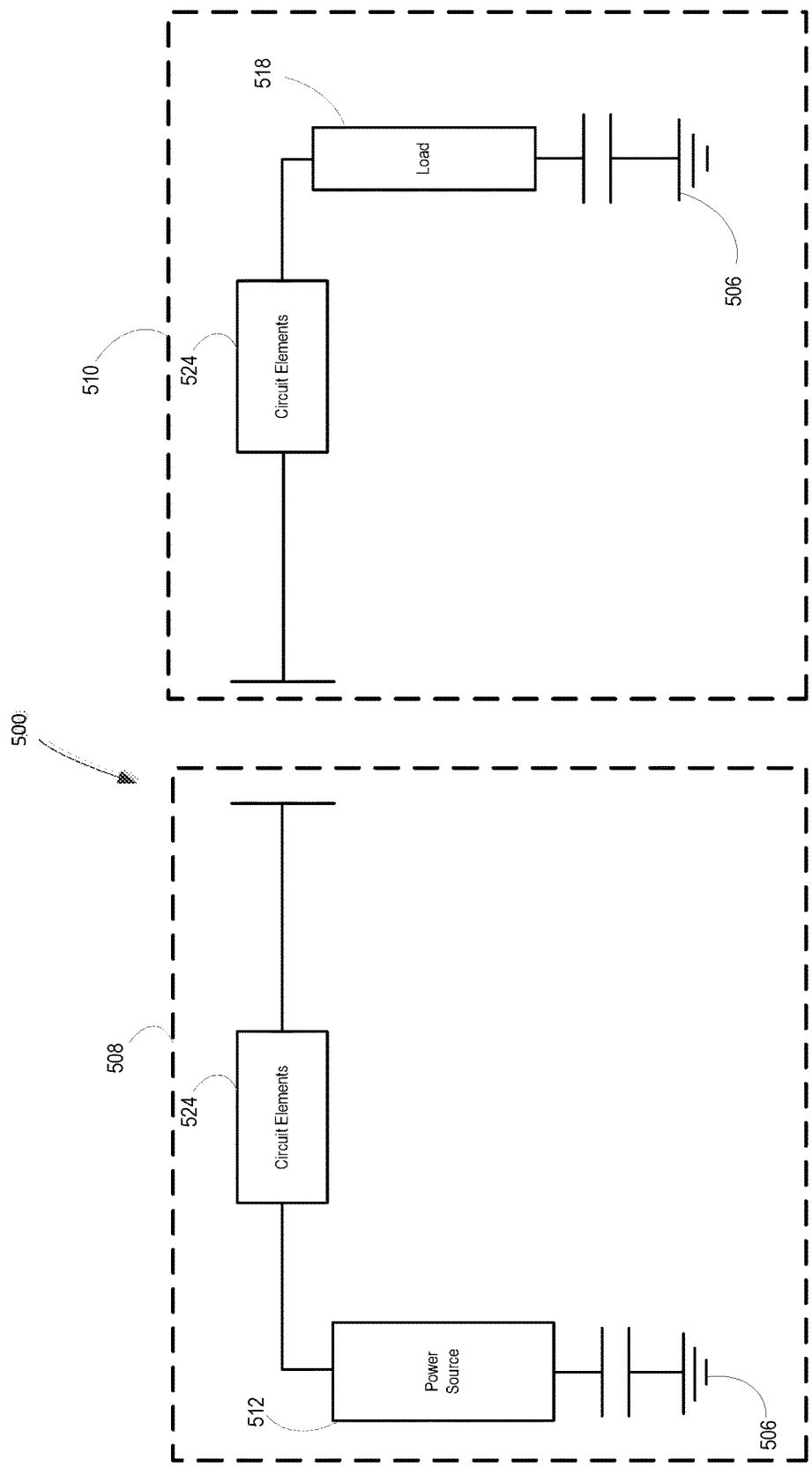

FIG. 5A, FIG. 5B, and FIG. 5C illustrate a system, in three representations, that includes a common mode capacitive resonator, according to an exemplary embodiment. Each of transmit-resonator 502 and receive-resonator 504 includes a common mode capacitive resonator. As such, each resonator includes a common mode capacitor that includes a conductor and ground reference 506. Ground reference 506 may conduct current to complete the circuit of transmitter 508 and receiver 510. Further, transmitter 508 may be coupled with power source 512 that may be connected on one end to ground reference 506 and on the other end to at least transmitter conductor 514. Optionally power source 512 need not be connected to the ground reference 506. Transmit-resonator 502 may resonate upon receiving, from power source 512, a signal that is oscillating at the system resonant frequency. As the transmit-resonator 502 resonates, common mode capacitor 516 of the transmit-resonator 502 may generate an electric field oscillating at the system resonant frequency. Receiver 510 may include load 518 that may be connected on one end to ground reference 506 and on the other end to receiver conductor 520. If within the near field of transmit-resonator 502, the receive-resonator 504 (which includes common mode capacitor 522) may couple with the oscillating electric field, thereby establishing a wireless resonant coupling link. As such, receive-resonator 504 may resonate, and may generate a signal that may be delivered to the load.

In some embodiments, the ground reference of the common mode capacitors may be connected to earth ground via a direct or an indirect connection. For example, the ground reference may include the infrastructure of a building housing the wireless power system, which may include an indirect connection to earth ground. In other examples, the ground reference may include a conductive object connected to common mode capacitors. As such, the conductive object may provide a conductive return path in a circuit including a transmitter and/or a receiver.

Figure 6A:
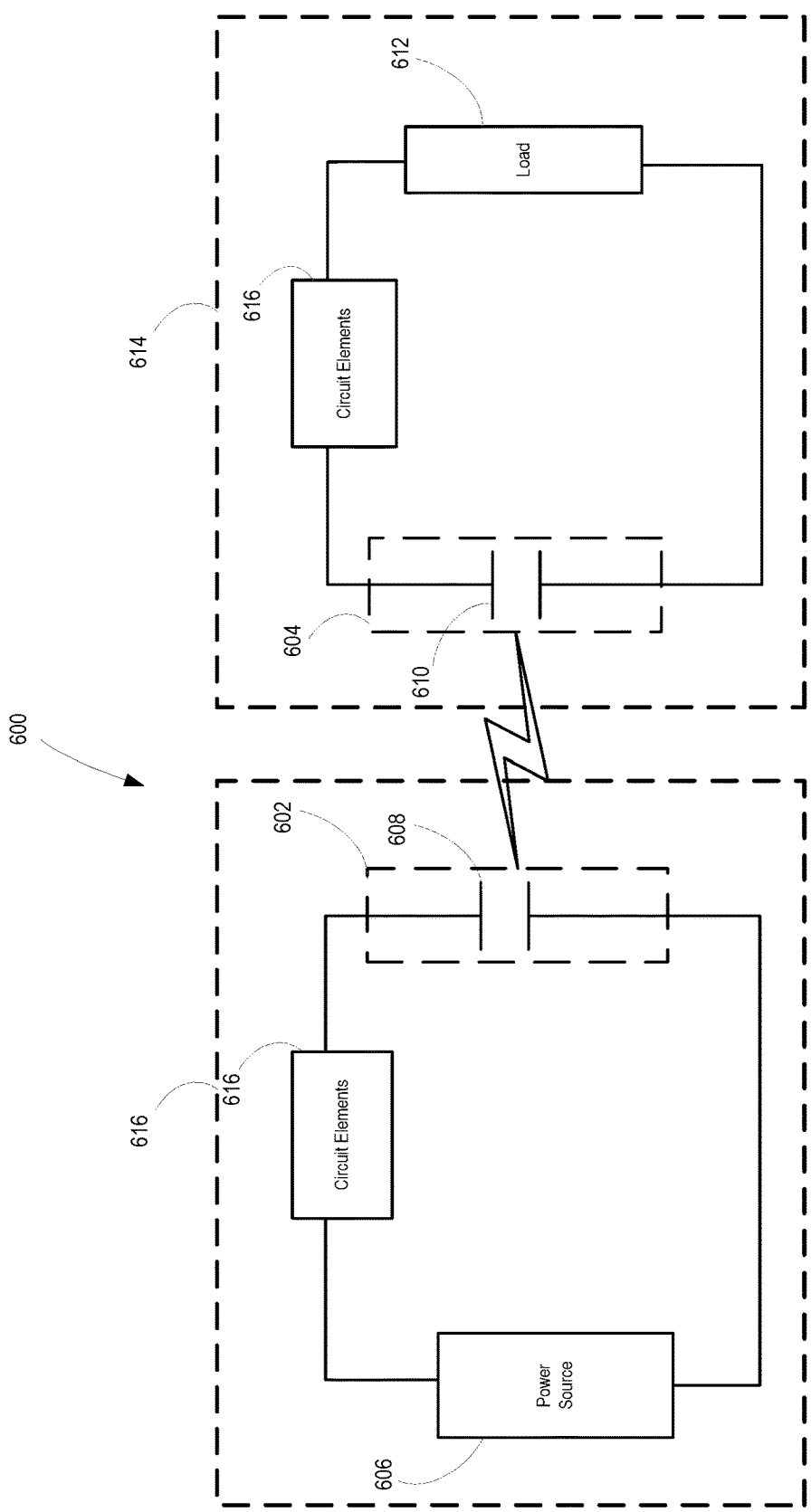
FIG. 6A to 6B is a simplified circuit diagram illustrating differential mode capacitive resonant coupling, according to an example embodiment.
Figure 6B:
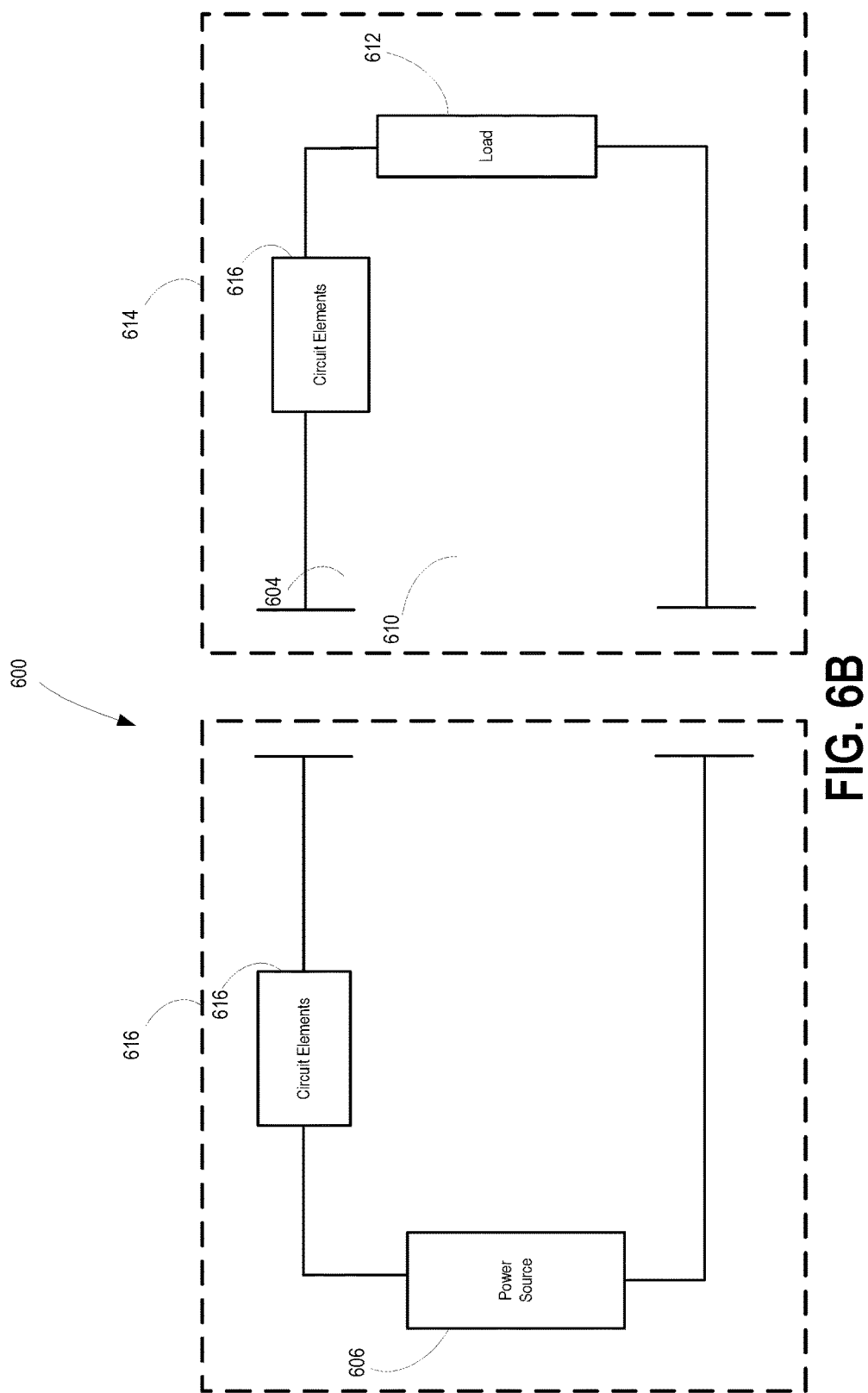

FIGS. 6A and 6B illustrate a system 600, in two representations, which includes a differential mode capacitor, according to an exemplary embodiment. Each of transmit-resonator 602 and receive-resonator 604 may include at least one capacitor. Power source 606 may supply a signal oscillating at a system resonance frequency to transmit-resonator 602. Transmit-resonator 602 may resonate upon receiving the signal from source 606. As transmit-resonator 602 resonates, transmitter differential mode capacitor 608 may generate an electric field oscillating at the system resonant frequency. Receive-resonator 604, if in proximity to the transmit-resonator 602, may couple with the oscillating electric field. As such, a wireless resonant coupling link may be established between the transmitter and the receiver. Furthermore, receiver differential mode capacitor 610 may resonate, and may therefore generate a signal that may be delivered to load 612 coupled to receiver 614.

In example embodiments, a system may establish a wireless resonant coupling link between a transmitter and a receiver according to one or more coupling modes that include a capacitive resonant coupling mode and an inductive resonant coupling mode. A transmitter and a receiver may each include the resonators necessary to establish a wireless link in each of the coupling modes. Furthermore, a wireless coupling link may be maintained between the transmitter and the receiver that utilizes different coupling modes simultaneously or individually. In some examples, the resonators may include a single circuit element that may be configured to operate either as an inductor, a capacitor, or both. In an example, an element may include coils shaped like a pair of conductor plates, such that the element may operate as an inductor and/or a capacitor. In other examples, a transmitter or receiver may include multiple resonators arranged in a resonator bank. The resonator bank may include at least one resonator that may include an inductor, and at least one resonator that may include a capacitor. Accordingly, the resonator bank may be configured to establish wireless resonant coupling links in capacitive and inductive resonant coupling modes.

Figure 7:
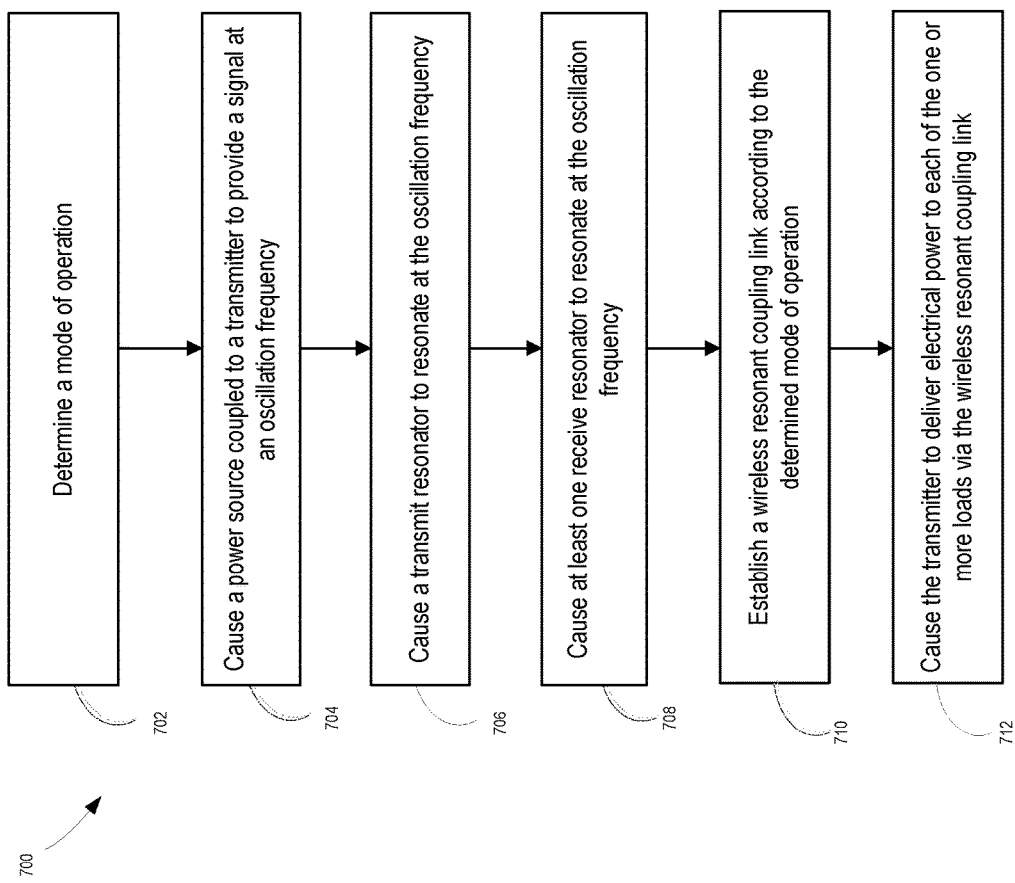
FIG. 7 illustrates a method of delivering electrical power from a transmitter to one or more loads, according to an example embodiment.

FIG. 7 illustrates a flowchart showing a method 700 that may establish a wireless resonant coupling link between a transmitter and a receiver of a system, according to an exemplary embodiment. In some embodiments, method 700 may be carried out by a controller of a system.

Furthermore, as noted above, the functionality described in connection with the flowcharts described herein can be implemented as special-function and/or configured general-function hardware modules, portions of program code executed by one or more processors for achieving specific logical functions, determinations, and/or steps described in connection with the flowchart shown in FIG. 7. For example the one or more processors may be part of controller 114. Where used, program code can be stored on any type of non-transitory computer-readable medium, for example, such as a storage device including a disk or hard drive.

In addition, each block of the flowchart shown in FIG. 7 may represent circuitry that is wired to perform the specific logical functions in the process. Unless specifically indicated, functions in the flowchart shown in FIG. 7 may be executed out of order from that shown or discussed, including substantially concurrent execution of separately described functions, or even in reverse order in some examples, depending on the functionality involved, so long as the overall functionality of the described method is maintained.

As shown by block 702, of FIG. 7, method 700 may involve determining an operational state of a system. The determined operational state may include at least one coupling mode. For example, the determined operational state may include any of the wireless coupling modes described herein. Within examples, the determined operational state may be determined by a controller of the system. As shown by block 704, method 700 further includes causing a power source that is coupled to a transmitter of a system to provide a signal at an oscillation frequency. For example, the oscillation frequency may be one of the one or more resonant frequencies of the transmitter. In some embodiments, the oscillation frequency may be a frequency within a range of resonant frequencies of the transmit-resonator.

Accordingly, as shown by block 706, a transmit-resonator may resonate at the oscillation frequency upon receiving the signal from the power source of the system. The oscillating transmit-resonator may generate a field oscillating at the oscillation frequency. In some embodiments, the transmit-resonator may generate a field that may be oscillating at a frequency within a range of resonant frequencies of the receive-resonator. As shown by block 708, if a receive-resonator is located within the range of the oscillating field generated by the transmit-resonator, the receive-resonator may also resonate at the oscillation frequency. As a result, as shown by block 710, a wireless resonant coupling link may be established according to the determined operational state. Finally, method 700 may cause the transmitter to deliver electrical power to each of the one or more loads via the established wireless resonant coupling link, as shown by block 712.

FIG. 8 illustrates different combinations of coupling modes that may form wireless resonant coupling link, according to an exemplary embodiment. In an example embodiment, a system may include a transmitter and a receiver both having three different types of resonator elements (e.g. an inductor, a common-mode capacitor, and a differential-mode capacitor). Accordingly, a wireless resonant coupling link between the transmitter and the receiver may include various combinations of the three different coupling modes. Accordingly, combinations 1-7 each include supporting a wireless resonant coupling link via at least one coupling mode. Operational state 8 represents when the system is not operating or when the transmitter and receiver are not coupled via a wireless resonant coupling link. Within examples, the various combinations of coupling modes forming the wireless coupling link between the transmitter and the receiver may be determined and controlled by a controller. In other examples, a user may provide an input to the controller that may direct the system to form a wireless resonant coupling link with a given combination of coupling modes.

In an example embodiment, a system may establish wireless resonant coupling links between a transmitter and a plurality of receivers. In such a scenario, the plurality of receivers may all operate in a single operational state to establish simultaneous links to the transmitter. In other scenarios, each of the receivers may establish a wireless resonant coupling link with the transmitter using a different coupling mode. Transmitters of such systems may include a resonator bank configured to enable simultaneous links with a plurality of receivers via one or more coupling modes.

As explained elsewhere herein, a system may employ time division multiple access (TDMA) to establish a wireless resonant coupling link that may be shared by a plurality of receivers. Specifically, the wireless resonant coupling link may be divided into different time slots within a given time frame. As such, each receiver of the plurality of receivers may receive electrical power from the transmitter during an assigned time slot within the given time frame. In other words, within the given time frame, the transmitter may distribute power to a given receiver during a given time slot. Each receiver may be assigned to receive power during one or more time slots within the time frame.

FIG. 9A illustrates a TDMA wireless resonant coupling link, according to an exemplary embodiment. Specifically, the ten time slots (T1-T10) may represent a single time frame of power distribution. The same distribution may be repeated in subsequent time slots T11-T20 and/or time frames (not shown). Furthermore, a controller of the system may assign each receiver of the system one or more time slots during which the receiver may receive power from the transmitter. In this example, receivers 1-4 are configured to receive power from the transmitter during various time slots of this time frame, whereas receiver 5 is not configured to receive power. In such a scenario, a controller may assign receivers 1-4 specific time slots during which they may receive power from the transmitter. The power may be transferred to a receiver during a given time slot according to any of the modes of operation of a system. Within examples, the controller may determine the operational state (e.g., the coupling mode type(s)) of each receiver during each interval of time. In other examples, the operational state may be input by a user of the respective receiver.

Figure 9B:
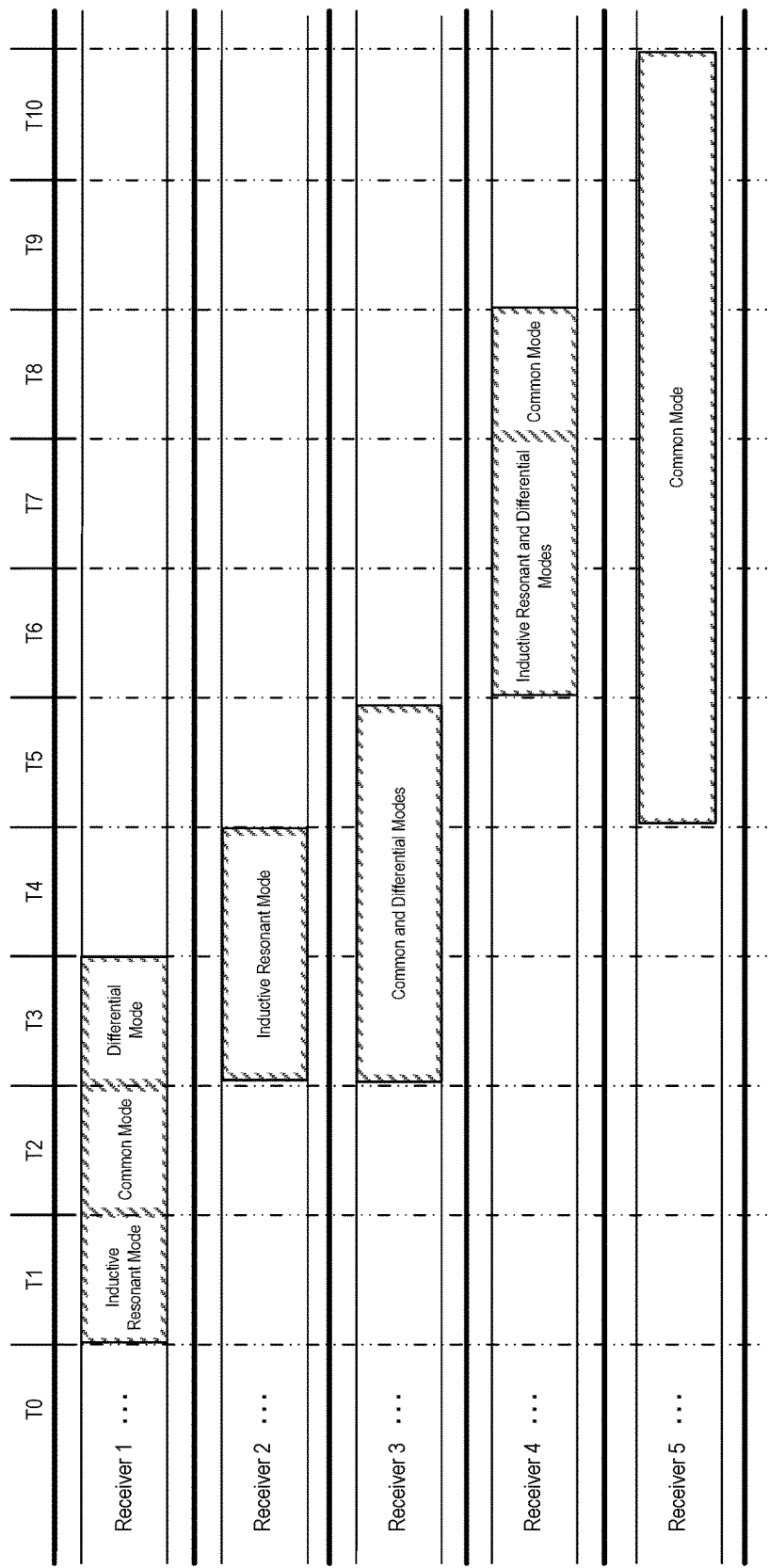

FIG. 9B illustrates a TDMA wireless resonant coupling link, according to an exemplary embodiment. Similar to the system illustrated in FIG. 9A, the ten time slots (T1-T10) may represent a single frame of power distribution. However, as illustrated in FIG. 9B, more than one receiver may receive power simultaneously from the transmitter. Furthermore, each receiver may receive power according to any of the modes of operation of the system. In some examples, the receivers receiving power simultaneously may receive power according to the same mode of operation. In other examples, the receivers receiving power simultaneously may receive power according to different modes of operation.

In accordance with some embodiments, the components (e.g., transmitter and receiver) of a system may include circuit elements (shown as element 212 in FIG. 2, element 414 in FIG. 4, element 524 in FIG. 5, and element 616 in FIG. 6), such as inductors, capacitors, transistors, inverters, amplifiers, rectifiers, varactors, relays, diodes, transmission lines, resonant cavities and switches, which may be arranged to facilitate switching between the different coupling modes of a system. For example, a system may switch between the different modes by having both a coil and one or two (or more) conductors in a combination of series-parallel connections. In other examples, a system may dynamically suppress or enhance a coupling mode by dynamically adding lumped element reactive components in series or parallel between the elements of the resonator of each mode.

In some examples, the operational state of a system may be determined by a controller of the system. For example, a controller may determine the mode of the operation of the system based on data that it may receive from a receiver, such as the receiver's power demands, preferred operational state, and location. Alternatively or additionally, the controller may determine the operational state based on data that may be input by a user of the system. Furthermore, the operational state may be determined based on the status of the system and/or environmental conditions.

In some embodiments, a controller may switch the operational state in response to detecting a parasitic device (using methods described herein) that may be diverting power from a legitimate receiver. In an example, a system may be operating in a state that utilizes common mode resonant coupling. However, a controller may detect a parasitic device that may also be coupled to the transmitter using common mode. In response, the controller may stop wireless power delivery via the common mode, and may enable wireless power delivery via a differential capacitive coupling mode, an inductive resonant coupling mode, or both. In other embodiments, a controller may use environmental conditions to determine the system's operational state. For example, a controller may receive information indicative of a presence of high ferrite content objects in the system's environment. Accordingly, the controller may determine to operate in a mode that does not utilize inductive resonant coupling mode.

A controller may also determine an amount of electrical power that a system may deliver to each load in the system. The controller may also make a determination of how much electrical power to deliver to each load via each available coupling mode in the system. Accordingly, in an example, the controller may cause the power source to direct the determined amount of power to a resonator bank and further control the delivery of power to the respective receivers via the respective determined coupling modes.

Furthermore, external elements may be installed in a system's environment, which may be configured to improve or otherwise modify the performance of the system. In some embodiments, field concentrators may be configured to shape an oscillating magnetic field (of an inductive resonator), an oscillating electric field (of a capacitive resonator), or both. For example, high permeability materials, such as ferrites, may be installed in a system's environment. In an example embodiment, while the system is operating in inductive resonant coupling mode, the high permeability material may be arranged so as to shape the oscillating magnetic field and extend its range. Similarly, high permittivity dielectric materials may be arranged in a system's environment. A capacitor of the system may utilize the high permittivity dielectric materials to increase or otherwise modify its capacitance, and hence adjust the properties of the electric field produced by a resonant capacitor. Furthermore, conductors may also be arranged in a system's environment so as to affect the magnetic and/or the electric field produced by the system's resonators.

Within examples, a system may include circuit elements that may be used as necessary in the system to implement the system's functionality. For example, a system may include circuit elements such as inverters, varactors, amplifiers, transmission lines, resonant cavities rectifiers, transistors, switches, relays, capacitors, inductors, diodes, and conductors. A relay may be used for switching between circuit elements configured to operate each coupling mode. As explained herein, a switch may connect a load to a receiver, such that the load is switchably coupled to the receive-resonator. Other examples of possible uses for various circuit elements are possible.

B. Power Transfer to Legitimate Receiver(s)

Figure 10:
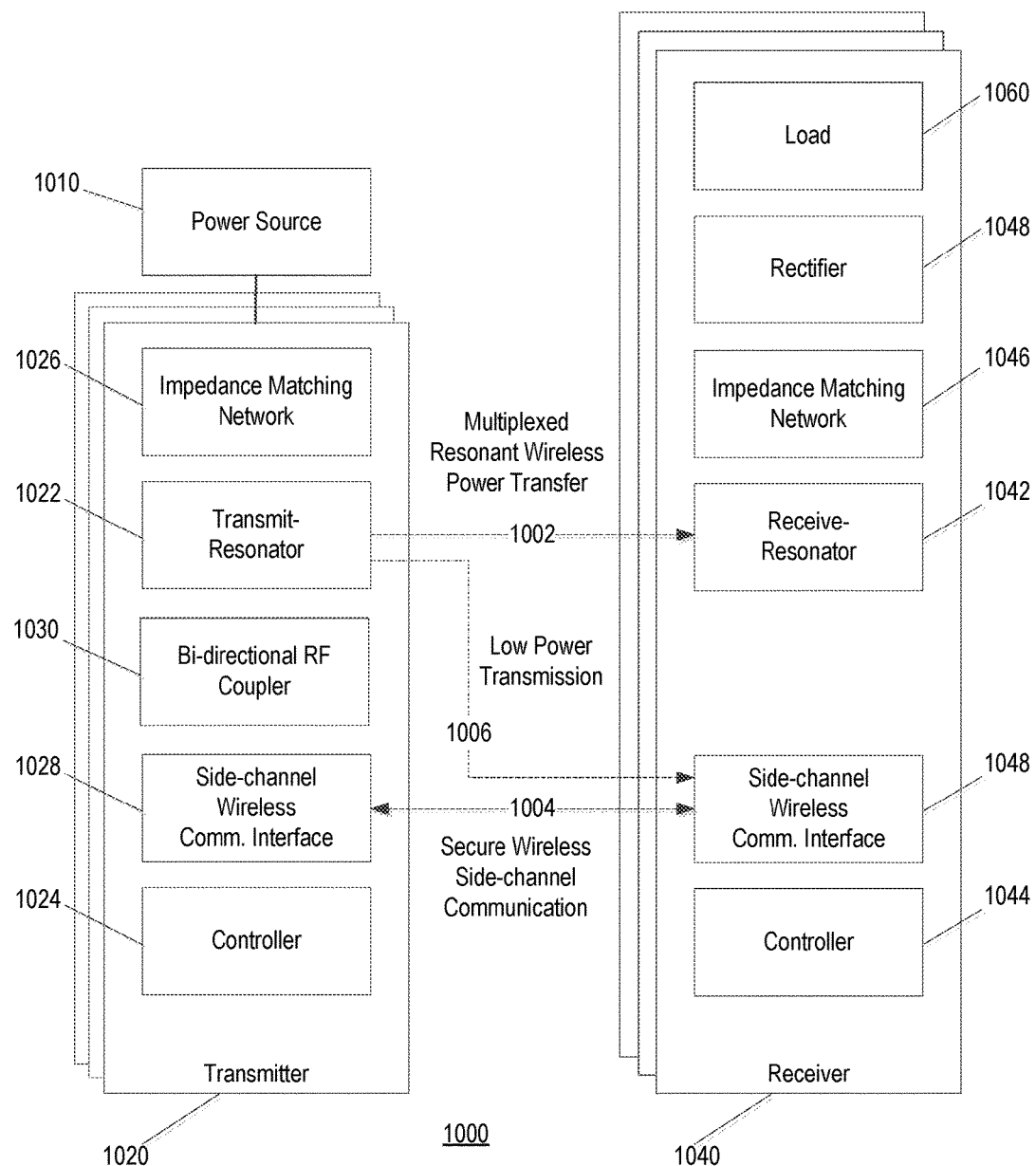
FIG. 10 is a functional block diagram illustrating a wireless power delivery system employing side-channel communications, according to an example embodiment.

FIG. 10 illustrates a resonant wireless power delivery system 1000 according to an example embodiment. The system 1000 includes a power source 1010, a transmitter 1020, and a receiver 1040. The transmitter 1020 receives power from the power source 1010 and wirelessly transfers this power to the receiver 1040. The transmitter 1020 may be one of a plurality of transmitters. The receiver 1040 is one of a plurality of receivers that may receive power from the transmitter 1020.

The transmitter 1020 includes a transmit-resonator 1022, and the receiver 1040 includes a receive-resonator 1042. The transmit-resonator 1022 is supplied with a power signal from the power source 1010 oscillating at a resonant frequency $\omega_0$. As described above, the transmit-resonator 1022 resonates at the resonant frequency $\omega_0$ and generates a field that oscillates at the resonant frequency $\omega_0$. The receiver-resonator 1042 is correspondingly configured to resonate at the resonant frequency $\omega_0$. The receiver 1040 is placed in sufficient proximity to the transmitter 1020 to couple the receive-resonator 1042 with the field generated by the transmit-resonator 1022, e.g., the receiver-resonator 1042 is within the field of the transmit-resonator 1022 depending for instance on the quality factor Q as described above. This coupling establishes a resonant power transfer link 1002 that provides a wireless conduit for power transfer between the transmit-resonator 1022 and the receive-resonator 1042. As also described above, the transmit-resonator 1022 and the receive-resonator 1042 may be coupled via an oscillating magnetic field and/or an oscillating electric field. In particular, the coupling may include any one or more of the following three modes: (i) inductive mode, (ii) differential capacitive mode, and (iii) common capacitive mode.

While the receive-resonator 1042 resonates in response to the oscillating field, a rectifier 1048 or other power conversion circuit may convert power from the receive-resonator 1042 and subsequently deliver the power to a load 1060. While the load 1060 is incorporated into the receiver 1040 as illustrated in FIG. 10, some embodiments may include loads that are physically separate or otherwise apart from the receiver 1040.

As shown in FIG. 10, the transmitter 1020 includes a controller 1024. In an example embodiment, the controller 1024 may determine what coupling mode(s) to employ and may control various elements of the transmitter 1020 so as to establish and/or maintain wireless resonant coupling links according to the determined coupling mode(s). The controller 1024 may also determine the amount of power that is transferred via the respective coupling mode(s).

As also described above, higher efficiencies can be achieved by adjusting impedances (resistance and/or reactance) on the transmitting side and/or the receiving side, e.g., impedance matching. Accordingly, the transmitter 1020 may include an impedance matching network 1026 coupled to the transmit-resonator 1022. Similarly, the receiver 1040 may include an impedance matching network 1046 coupled to the receive-resonator 1042.

In an example embodiment, a plurality of devices and objects may be present within a local environment of the transmitter 1020. In such a scenario, the example system 1000 may be configured to distinguish legitimate receivers from illegitimate devices that are not intended recipients of power transfer. Without an ability to discriminate between possible recipients of power transfer, illegitimate devices may act as parasitic loads that may receive power from the transmitter without permission. Thus, prior to transferring power to the receiver 1040, the transmitter 1020 may carry out an authentication process to authenticate the receiver 1040. In an example embodiment, the authentication process may be facilitated via a wireless side-channel communication link 1004.

The transmitter 1020 may include a wireless communication interface 1028 and the receiver 1040 may include a corresponding wireless communication interface 1048. In such a scenario, the transmitter 1020 and the receiver 1040 may establish a side-channel communication link 1004 via a wireless communication technology. For instance, classic BLUETOOTH® or BLUETOOTH® LOW ENERGY (BLE) (2.4 to 2.485 GHz UHF) or WIFI™ (2.4 GHz UHF/5 GHz SHF) may be employed to provide secure communications between the transmitter 1020 and the receiver 1040. Other wireless communication protocols are possible and contemplated. As shown in FIG. 10, the side-channel link 1004 communicatively couples the transmitter 1020 and the receiver 1040 over a secondary channel that is separate from the resonant power transfer link 1002. In alternative embodiments, however, the transmitter 1020 and the receiver 1040 may employ the same channel to transfer power and communicate information as described herein, e.g., by modulating aspects of the power transfer to communicate the information.

In an example embodiment the transmitter 1020 can communicate with the receiver 1030 over the side-channel communication link 1004 to determine that the receiver 1040 is authorized or otherwise permitted to receive power. The receiver 1040 may be configured to provide any type of information and/or acknowledgement required by the transmitter 1020 to authenticate the receiver 1040. For instance, the receiver 1040 may transmit an authentication code, a message, or a key to the transmitter 1020. In such scenarios, a device without the ability to establish side-channel communications with the transmitter 1020 may not be identified as a legitimate device.

The receiver 1040 may also include a controller 1044. As such, the controllers 1024, 1044 can conduct communications via the side-channel link 1004 and process the information exchanged between the transmitter 1020 and the receiver 1040.

As described above, when power is transferred from the transmitter 1020 to the receiver 1040, power may be reflected back to the transmitter 1020 As FIG. 10 illustrates, the transmitter 1020 may include a bi-directional RF coupler 1030 to measure the reflected power as also described above. Using measurements from the bi-directional RF coupler 1030, an optimal efficiency for the power transfer link 1002 may be ascertained, and the impedance(s) on the transmitting and/or receiving sides can be adjusted via the impedance matching networks 1026, 1046 so as to optimize or otherwise modify power delivery efficiency.

The impedance associated with the receiver 1040 may be determined based on the reflected power detected by measurement devices in conjunction with the bi-directional RF coupler 1030. If a nominal impedance (e.g., a designed impedance) of the receiver 1040 is known, a difference between the nominal impedance and the calculated impedance based on the measurement of reflected power may indicate a presence of one or more parasitic loads. Such parasitic loads may include illegitimate receivers. Using the side-channel communication link 1004 established between the transmitter 1020 and the receiver 1040, the receiver 1040 may be operable to communicate its nominal impedance to the transmitter 1020. Thus, the calculation of impedance using the bi-directional RF coupler 1030 may enable the identification of parasitic loads as well as enable dynamic impedance matching as disclosed elsewhere herein. The impedance(s) of the transmitter 1020 and/or the receiver 1040 can be adjusted via the impedance matching networks 1026, 1046 to account for the parasitic loads.

As described herein, the transmitter 1020 may be operable to identify the existence of the legitimate receiver 1040 through authentication communications via the side-channel communication link 1004. Additionally or alternatively, the transmitter 1020 may be operable to distinguish the legitimate receiver 1040 from other legitimate or illegitimate devices by other methods. In particular, the transmitter 1020 may be operable to control the power transfer link 1002 and the communication over the side-channel communication link 1004 with the same receiver 1040.

The side-channel communication link 1004 may be employed to identify and authenticate the receiver 1040 and to establish and adjust aspects of the power transfer link 1002, particularly to account for parasitic loads. Specifically, the side-channel communication link 1004 and the power transfer link 1002 may enable a variety of authentication protocols so as to provide secure communications and power delivery. For example, the transmitter 1020 and receiver 1040 may be operable to conduct a password authentication protocol (PAP), a challenge-handshake authentication protocol (CHAP), multi-factor authentication, or another type of cryptographic protocol. In general, however, the transmitter 1020 and the receiver 1040 may employ the side-channel communication link 1004 to exchange any type of information to manage any aspect of the power transfer link 1002.

In an example embodiment, the system 1000 may help ensure the availability of the side-channel communication link 1004 by intermittently or continuously transmitting a certain amount of power via a predetermined wireless resonant coupling link configuration. This transmission 1006 can power the wireless communication interface 1048 and allow it to remain active even if other aspects of the receiver 1040 do not receive power. As such, the receiver 1040 may receive sufficient power to establish initial communications with the transmitter 1020. Thereafter, the receiver 1040 may establish the power transfer link 1002. For instance, the transmission 1006 may provide a low power, e.g., approximately 1 W. In such a scenario, the power distribution efficiency of the transmission 1006 is less of a concern at relatively low powers.

As described above, the controller 1024 may determine what coupling mode to employ in the example system 1000. The controller 1024 may select coupling mode(s) based on the identification of parasitic loads. For instance, the transmitter 1020 may deliver power to the receiver 1040 via a common capacitive mode during a first time period. However, subsequent to the first time period, the controller 1024 may detect a parasitic device that may also be coupled to the transmitter 1020 via common capacitive mode. Consequently, the controller 1024 may cause the transmitter 1020 and/or the receiver 1040 to a switch to differential capacitive mode and/or inductive mode.

III. Wireless Power Handover

Generally, a wireless power transmission system could include two or more transmitters each configured to provide electrical power via a respective wireless resonant coupling link. These transmitters may be placed throughout an environment in various ways. For instance, transmitters could be positioned at various portions of a physical space so as to provide for wireless power coverage throughout respective areas or volumes of physical space. In this way, a receiver that moves throughout the physical space can wirelessly receive electrical power while located at various portions of the physical space.

Figure 11:
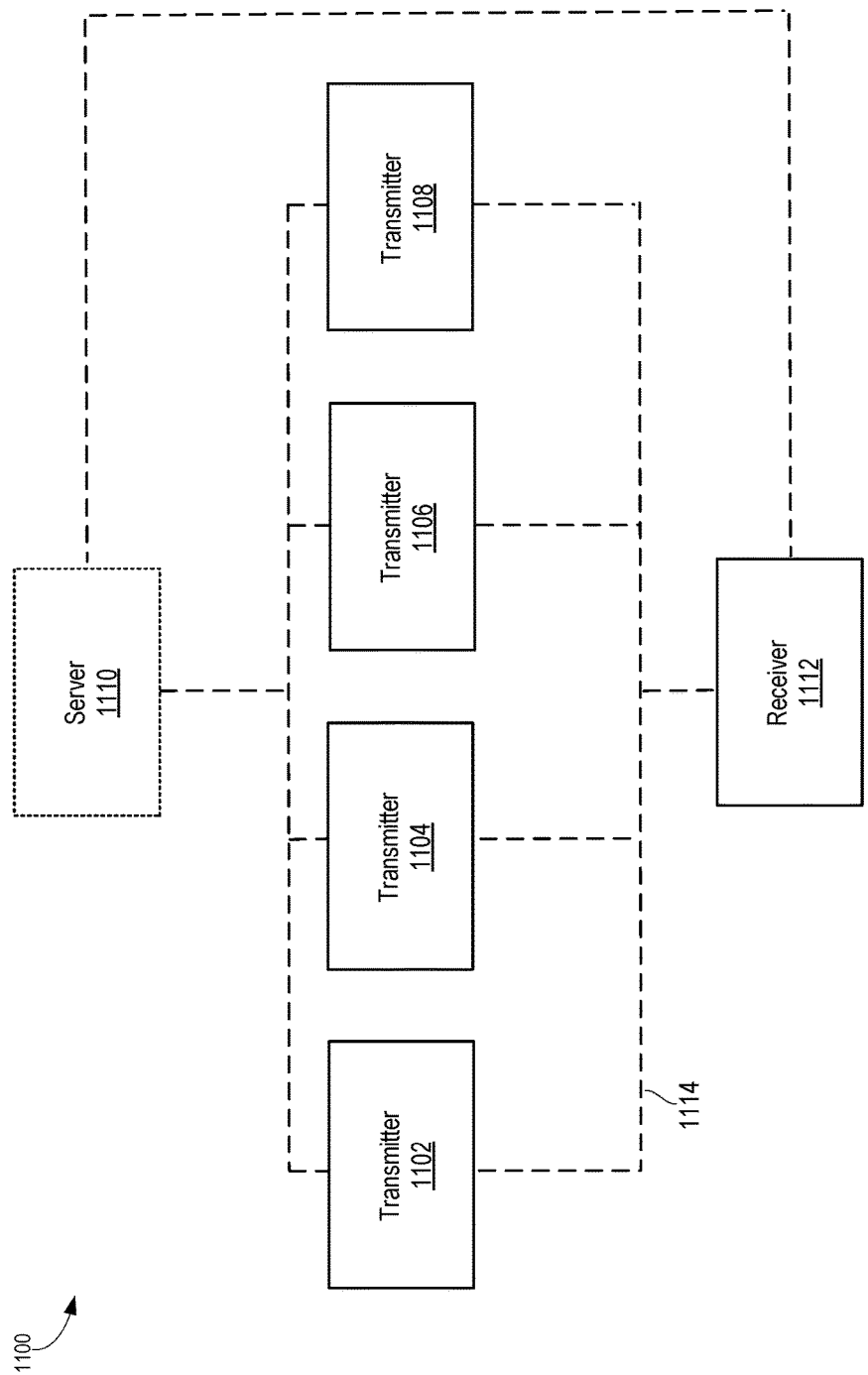
FIG. 11 is a functional block diagram illustrating a wireless power transmission system, according to an example embodiment.

FIG. 11 illustrates an example wireless power transmission system 1100 including four transmitters 1102-1108 and optionally also a server 1110. Any one of the transmitter 1102-1108 may wirelessly provide electrical power to a receiver 1112 via a respective wireless resonant coupling link. Moreover, the transmitters 1102-1108, the server 1110, and the receiver 1112 may communicate with one another via respective side-channel communication links 1114 (illustrated by the dashed lines), which may be wireless communications link(s) as described elsewhere herein.

The optional server 1110 may include a controller configured to facilitate various operations of the system 1110. For example, the server 1110 may operate any one of the transmitters 1102-1108 to cause the respective transmitter to provide electrical power to the receiver 1112. In another example, the server 1110 may receive and possibly store information about the receiver 1112 and/or the transmitters, such as information related to power demand of a receiver, power being provided by a transmitter, and/or authentication information, among other possibilities.

Although the server 1110 could help facilitate various operations of the system 1110, any of the entities shown in FIG. 11 may additionally or alternatively facilitate various operations of the system 1110. For example, each of the transmitters 1102-1108, the server 1110, and/or the receiver 1112 may include a respective controller configured to carry out respective operations, such as any of those described herein. Additionally or alternatively, as noted above, a controller may include a distributed computing system.

As such, for sake of simplicity, various implementations may be described herein in the context of a controller carrying out certain operations. It should be understood, however, that any individual entity and/or a combination of the entities disclosed herein may carry out any one of these described operations. Other illustrations are possible as well.

In a system arranged as described above, a controller may facilitate a handover of a receiver from a first transmitter (e.g., transmitter 1102) to a second transmitter (e.g., transmitter 1104). In particular, the controller may initially cause the first transmitter to provide electrical power to the receiver via a first wireless resonant coupling link using a first oscillation frequency. Then, the controller may determine that a handover condition is met and may responsively facilitate a handover to the second transmitter. Upon completion of the handover, the second transmitter may provide electrical power to the receiver via a second wireless resonant coupling link using a second oscillation frequency that could be the same as or different from the first oscillation frequency. Furthermore, the first transmitter may no longer provide electrical power to the receiver.

In an example implementation, the handover condition being met may indicate to a controller that the first transmitter should no longer provide electrical power to the receiver, and thus that the controller should carry out operations so as to ultimately cause the first transmitter to no longer provide electrical power to the receiver.

In some embodiments, the indication that the first transmitter should no longer provide electrical power to the receiver may be based on a determination that the first transmitter may no longer be able to meet the receiver's power requirements (e.g., power demand). In this case, the controller may then determine a transmitter that is a candidate to provide electrical power to the receiver, which may be the second transmitter at issue.

In other embodiments, however, the controller may determine that the second transmitter is a candidate to provide electrical power to the receiver instead of the first transmitter, and may do so whether or not the controller actually determines that the first transmitter is able to meet the receiver's power requirements. Thus, the indication that the first transmitter should no longer provide electrical power to the receiver may be based on a determination that a second transmitter is a candidate to replace the first transmitter as the transmitter that provides electrical power to the receiver. Such a determination may be due to a prior determination that the second transmitter is able to meet the receiver's power requirements and, in some embodiments, do so with metric(s) that are superior to those provided by the first transmitter (e.g., a higher coupling factor).

Accordingly, the controller may use various approaches to determine that a transmitter should be considered as a candidate to provide electrical power to the receiver. By way of example, the controller may have stored thereon or may otherwise have access to a neighbor list that specifies one or more neighboring transmitters that are positioned nearby the first receiver (e.g., within a threshold distance of the first receiver). In some embodiments, a given transmitter may be included in the neighbor list based on manual engineering input that establishes the given transmitter as a neighboring transmitter, based on detection of a broadcast signal emitted by the given transmitter to broadcast its nearby presence, and/or based on information that is received from the receiver and that indicates that the receiver detected the broadcast signal, among other possibilities. In this example, the controller may thus determine that neighboring transmitters listed on the neighbor list should be further evaluated so as to determine whether at least one of those neighboring transmitters should provide electrical power to the receiver instead of the first receiver. Other examples are also possible.

Furthermore, the controller may determine that a handover condition is met in various ways. Although various approaches for determining that a handover condition is met are described below, other approaches and/or a combination of these approaches are possible as well without departing from the scope of the present disclosure.

In one case, the controller may determine that a handover condition is met based on evaluation of coupling factor(s). In particular, as noted, a magnitude of coupling between a transmitter and a receiver can be represented by a coupling factor k, a dimensionless parameter representing the fraction of flux coupling the transmitter and the receiver. In some embodiments, the coupling factor may decrease as distance between the receiver and the transmitter increases, and vice versa. As such, the controller may respectively determine coupling factor(s) of a wireless resonant coupling link(s) and may use the determined coupling factor(s) as basis for determining whether or not a handover condition is met.

More specifically, the controller may determine a coupling factor of a first wireless resonant coupling link through which the receiver receives electrical power from the first transmitter. Then, the controller may determine whether or not the coupling factor of the first wireless resonant coupling link is below a first threshold coupling factor. If the controller determines that the coupling factor of the first wireless resonant coupling link is indeed below the first threshold coupling factor, this determination may amount to a determination by the controller that the handover condition is met.

In some embodiments, the first threshold coupling factor may take on one of various forms. In one example, the first threshold coupling factor may be a first predetermined threshold coupling factor that is established by way of manual engineering input and/or in other ways. In another example, the controller may determine a coupling factor of a second wireless resonant coupling link through which the receiver could receive electrical power from the second transmitter, and the controller may set the first threshold coupling factor to be that determined coupling factor of the second wireless resonant coupling link. In this way, the controller may effectively compare the coupling factors so as to determine whether a first coupling factor of the first wireless resonant coupling link is lower or higher than a second coupling factor of the second wireless resonant coupling link. Other examples are also possible.

In addition to or instead of evaluating coupling of the first wireless resonant coupling link, the controller may determine that a handover condition is met based on evaluation of a coupling factor of a second wireless resonant coupling link through which the receiver could receive electrical power from the second transmitter. In particular, the controller may determine a coupling factor of the second wireless resonant coupling link and may determine whether or not the coupling factor of the second wireless resonant coupling link is above a second threshold coupling factor. And if the controller determines that the coupling factor of the second wireless resonant coupling link is indeed above the second threshold coupling factor, this determination may amount to a determination by the controller that the handover condition is met.

In some embodiments, the second threshold coupling factor may take on one of various forms. In one example, the second threshold coupling factor may be a second predetermined threshold coupling factor that is established by way of manual engineering input and/or in other ways. The second predetermined threshold coupling factor could be the same as or different from the above-mentioned first predetermined threshold coupling factor. In another example, the controller may determine a coupling factor of the wireless resonant coupling link through which the receiver is receiving electrical power from the first transmitter, and the controller may set the second threshold coupling factor to be that determined coupling factor of the first wireless resonant coupling link. Here again, the controller may effectively compare the coupling factors so as to determine whether a first coupling factor of the first wireless resonant coupling link is lower or higher than a second coupling factor of the second wireless resonant coupling link. Other examples are also possible.

In some situations, assuming the controller effectively compares the first and second coupling factors in line with the discussion above, the controller may determine that the first coupling factor is the same as the second coupling factor. In such situations, the controller may respond to a determination that the first and second coupling factors are the same by determining that the first transmitter should continue to provide electrical power to the receiver. Alternatively, the controller may respond to a determination that the first and second coupling factors are the same by determining whether or not to handover the receiver based on other factors further described herein (e.g., based on received signal strength over a side-channel communication link and/or based on distance).

Furthermore, the controller may use one of several approaches to evaluate coupling of the first and second wireless resonant coupling links. By way of example, the controller may cause one transmitter at a time to provide electrical power to the receiver. With this approach, the controller may cause the receiver to separately determine characteristics of electrical power provided by each transmitter, so that electrical power provided by the other transmitter does not hinder accurate evaluation of characteristics of electrical power provided by the given transmitter. In such a scenario, the determined characteristics at issue may include a power level based on which the controller may determine the coupling factor and/or may include the coupling factor itself, among other possibilities.

More specifically, the controller may cause only the first transmitter to provide electrical power to the receiver during a first time period. During that first time period, the controller may cause the receiver to determine or otherwise provide information related to characteristics of the electrical power that the receiver receives from the first transmitter during the first time period. Based on these characteristics, the controller may determine a coupling factor of the first wireless resonant coupling link. Additionally or alternatively, the controller may cause only the second transmitter to provide electrical power to the receiver during a second time period. During that second time period, the controller may cause the receiver to determine or otherwise provide information related to characteristics of the electrical power that the receiver receives from the second transmitter during the second time period. Based on these characteristics, the controller may determine a coupling factor of the second wireless resonant coupling link. Other examples are also possible.

In another case, the controller may determine that a handover condition is met based on evaluation of signal strength of communications received over one or more side-channel communication links. In particular, a receive signal strength may be a strength at which an entity (e.g., the receiver) receives communications from another entity (e.g., the transmitter) over a side-channel communication link, and the received signal strength could be determined using signal analysis techniques, either those currently known and/or developed in the future. In some embodiments, assuming that communications over the side-channel communication link(s) are wireless, the receive signal strength may decrease as a distance between the receiver and the transmitter increases, and vice versa. As such, the controller may respectively determine received signal strength(s) of communications over side-channel communication link(s) and may use the determined receive signal(s) as one possible basis for determining whether or not a handover condition is met.

More specifically, assuming that a first side-channel communication link has been established between the first transmitter and the receiver, the controller may determine a signal strength at which communications over the first side-channel communication link are being received. Then, the controller may determine whether or not the receive signal strength of communications over the first side-channel communication link is below a first threshold signal strength. And if the controller determines that receive signal strength of communications over the first side-channel communication link is indeed below the first threshold signal strength, such a determination may amount to a determination by the controller that the handover condition is met.

In some embodiments, the first threshold signal strength may take on one of several forms. In one example, the first threshold signal strength may be a first predetermined threshold signal strength that is established by way of manual engineering input and/or in other ways. In another example, the controller may determine receive signal strength of communications over a second side-channel communication link between the receiver and the second transmitter, and the controller may set the first threshold signal strength to be the determined signal strength of the second side-channel communication link. In this way, the controller may effectively compare the signal strengths so as to determine whether a first signal strength of the first side-channel communication link is lower or higher than a second signal strength of the second side-channel communication link. Other examples are also possible.

In addition to or instead of evaluating receive signal strength of communications over the first side-channel communication link, the controller may determine that a handover condition is met based on evaluation of receive signal strength of communications over the second side-channel communication link. In particular, assuming that a second side-channel communication link has been established between the second transmitter and the receiver, the controller may determine a signal strength at which communications over the second side-channel communication link are being received (e.g., the controller may cause the receiver and the second transmitter to communicate over the second side-channel communication link so as to be able to evaluate the receive signal strength). Then, the controller may determine whether or not the receive signal strength of communications over the second side-channel communication link is above a second threshold signal strength. And if the controller determines that receive signal strength of communications over the second side-channel communication link is indeed above the second threshold signal strength, this determination may amount to a determination by the controller that the handover condition is met.

In some embodiments, the second threshold signal strength may take on one of various forms. In one example, the second threshold signal strength may be a second predetermined threshold signal strength that is established by way of manual engineering input and/or in other ways. This second predetermined threshold signal strength could be the same as or different from the above-mentioned first predetermined threshold signal strength. In another example, the controller may determine received signal strength of communications over the first side-channel communication link between the receiver and the first transmitter, and the controller may set the second threshold signal strength be that determined signal strength of the first side-channel communication link. Here again, the controller may effectively compare the signal strengths so as to determine whether a first signal strength of the first side-channel communication link is lower or higher than a second signal strength of the second side-channel communication link. Other examples are also possible.

In some situations, assuming the controller effectively compares the first and second signal strengths in line with the discussion above, the controller may determine that the first signal strength is the same as the second signal strength. In such situations, the controller may respond to a determination that the first and second signal strengths are the same by determining that the first transmitter should continue to provide electrical power to the receiver. Alternatively, the controller may respond to a determination that the first and second signal strengths are the same by making a decision as to whether or not to handover the receiver based on other factors further described herein (e.g., based on evaluation of coupling and/or based on evaluation of distance). Other situations are also possible.

In a further aspect, the evaluation of received signal strength could be used as basis for determining that the second transmitter is within a threshold distance of the receiver and/or that the second transmitter is closer to the receiver than the first transmitter, among other options. Such a determination may correspond to a determination that the second transmitter is a candidate to provide power to the receiver. But then further consideration(s), such as the described coupling factor considerations, could be used as basis for determining that a handover condition to hand over the receiver to the second transmitter has been met. Other aspects are also possible.

In yet another case, the controller may determine that a handover condition is met based on evaluation of a distance between a receiver and a transmitter. Thus, the controller may respectively determine distance(s) between the receiver and transmitter(s) and may use the determined distance(s) as basis for determining whether or not a handover condition is met.

More specifically, the controller may determine a distance between the first transmitter and the receiver. Then, the controller may determine whether or not the distance between the first transmitter and the receiver is greater than a first threshold distance. If the controller determines that the distance between the first transmitter and the receiver is indeed greater than the first threshold distance, this determination may amount to a determination by the controller that the handover condition is met.

In some example embodiments, the first threshold distance may take on one of various forms. In one example, the first threshold distance may be a first predetermined threshold distance that is established by way of a manual engineering input and/or in other ways. In another example, the controller may determine a distance between the receiver and the second transmitter, and the controller may set the first threshold distance to be that determined distance between the receiver and the second transmitter. In this way, the controller may effectively compare the distances so as to determine whether a first distance between the receiver and the first transmitter is less than or greater than a second distance between the receiver and the second transmitter. Other examples are also possible.

In addition to or instead of evaluating distance between the receiver and the first transmitter, the controller may determine that a handover condition is met based on evaluation of a distance between the receiver and the second transmitter. In particular, the controller may determine distance between the second transmitter and the receiver. Then, the controller may determine whether or not the distance between the second transmitter and the receiver is less than a second threshold distance. If the controller determines that the distance between the second transmitter and the receiver is indeed less than the second threshold distance, this determination may amount to a determination by the controller that the handover condition is met.

In some embodiments, the second threshold distance may take on one of various forms. In one example, the second threshold distance may be a second predetermined threshold distance that is established by way of manual engineering input and/or in other ways. This second predetermined threshold distance could be the same as or different from the above-mentioned first predetermined threshold distance. In another example, the controller may determine a distance between the receiver and the first transmitter, and the controller may set the threshold distance to be that determined distance between the receiver and the first transmitter. Here again, the controller may effectively compare the distances so as to determine whether a first distance between the receiver and the first transmitter is less than or greater than a second distance between the receiver and the second transmitter. Other examples are also possible.

In some situations, assuming the controller effectively compares the first and second distances in line with the discussion above, the controller may determine that the first distance is the same as the second distance. In such situations, the controller may respond to a determination that the first and second distance are the same by determining that the first transmitter should continue to provide electrical power to the receiver. Alternatively, the controller may respond to a determination that the first and second distances are the same by making a decision as to whether or not to handover the receiver based on other factors further described herein (e.g., based on evaluation of coupling and/or based on evaluation of receive signal strength). Other situations are also possible.

Furthermore, the controller may use various approaches to determine a distance between a receiver and a transmitter. By way of example, the controller may include or otherwise have access to a location determination platform (e.g., Global Positioning System (GPS), Global Navigation Satellite System (GLONASS), and/or BeiDou Navigation Satellite System) that is configured to provide information about current locations of receiver(s) and transmitter(s). In this example, the controller may use the location determination platform to determine a location of a receiver and to determine a location of a transmitter. Based on the determined location of the receiver and the determined location of the receiver, the controller may determine the distance between the receiver and transmitter. In another example, the controller may determine a distance that corresponds to a determined coupling factor of a wireless resonant coupling link between the receiver and the transmitter, and may do so, for instance, based on mapping data that maps each of various coupling factors with a respective distance. In yet another example, the controller may determine a distance that corresponds to a determined received signal strength of a side channel communication link between the receiver and the transmitter, and may do so, for instance, based on mapping data that maps each of various received signal strength with a respective distance. Other examples are possible as well.

In yet another case, the controller may determine that a handover condition is met based on evaluation of orientation of the receiver (e.g., the receiver's receive resonator) relative to orientation of the transmitter (e.g., the transmitter's transmit resonator). Thus, the controller may respectively determine relative orientations between the receiver and transmitter(s) and may use the determined relative orientation(s) as basis for determining whether or not a handover condition is met.

More specifically, the controller may determine an orientation of the first transmitter relative to an orientation of the receiver, thereby resulting in a determination of a relative orientation (e.g., angular difference in orientation along an axis). Then, the controller may determine whether or not the relative orientation between the first transmitter and the receiver is greater than a first threshold relative orientation (e.g., threshold angular difference in orientation along an axis). If the controller determines that the relative orientation between the first transmitter and the receiver is indeed greater than the first threshold relative orientation, this determination may amount to a determination by the controller that the handover condition is met.

In some example embodiments, the first threshold relative orientation may take on one of various forms. In one example, the first threshold relative orientation may be a first predetermined threshold orientation that is established by way of a manual engineering input and/or in other ways. In another example, the controller may determine a relative orientation between the receiver and the second transmitter, and the controller may set the first threshold relative orientation to be that determined relative orientation between the receiver and the second transmitter. In this way, the controller may effectively compare the relative orientations so as to determine whether a first relative orientation between the receiver and the first transmitter is less than or greater than a second relative orientation between the receiver and the second transmitter. Other examples are also possible.

In addition to or instead of evaluating a relative orientation between the receiver and the first transmitter, the controller may determine that a handover condition is met based on evaluation of a relative orientation between the receiver and the second transmitter. In particular, the controller may determine a relative orientation between the second transmitter and the receiver. Then, the controller may determine whether or not the relative orientation between the second transmitter and the receiver is less than a second threshold relative orientation. If the controller determines that the relative orientation between the second transmitter and the receiver is indeed less than the second threshold relative orientation, this determination may amount to a determination by the controller that the handover condition is met.

In some embodiments, the second threshold relative orientation may take on one of various forms. In one example, the second threshold relative orientation may be a second predetermined threshold relative orientation that is established by way of manual engineering input and/or in other ways. This second predetermined threshold relative orientation could be the same as or different from the above-mentioned first predetermined threshold relative orientation. In another example, the controller may determine a relative orientation between the receiver and the first transmitter, and the controller may set the threshold relative orientation to be that determined relative orientation between the receiver and the first transmitter. Here again, the controller may effectively compare the relative orientations so as to determine whether a first relative orientation between the receiver and the first transmitter is less than or greater than a second relative orientation between the receiver and the second transmitter. Other examples are also possible.

In some situations, assuming the controller effectively compares the first and second relative orientations in line with the discussion above, the controller may determine that the first relative orientation is the same as the second relative orientation. In such situations, the controller may respond to a determination that the first and second relative orientations are the same by determining that the first transmitter should continue to provide electrical power to the receiver. Alternatively, the controller may respond to a determination that the first and second relative orientations are the same by making a decision as to whether or not to handover the receiver based on other factors further described herein (e.g., based on evaluation of coupling and/or based on evaluation of receive signal strength). Other situations are also possible.

Furthermore, the controller may use various approaches to determine a relative orientation between a receiver and a transmitter. By way of example, the receiver may include an orientation sensor (e.g., an inertial measurement unit (IMU)) arranged to provide first orientation data indicative of the receiver's orientation and the transmitter may an orientation sensor arranged to provide second orientation data indicative of the transmitter's orientation. With this arrangement, the controller may receive the first and second orientation data respectively from the receiver and the transmitter, and may use the first and second orientation data as basis for determining the relative orientation, such as by determining a difference between the receiver's orientation and the transmitter's orientation. Other cases and examples are possible as well.

As noted above, once the controller determines that a handover condition is met, the controller may then facilitate a handover of the receiver to the second transmitter. During the handover, the controller may carry out operations to ensure that the receiver electrical power from the wireless power transmission system with minimum interruptions. To do so, the controller may facilitate the handover using a "make before break" approach. Specifically, the controller may cause both the first and second transmitter to provide electrical power to the receiver at substantially the same time. Then, the controller may cause the first transmitter to no longer provide electrical power to the receiver and may cause the second transmitter to continue to provide electrical power to the receiver, thereby completing the handover.

FIGS. 12A-12D illustrate an example handover that is facilitated using the "make before break" approach. Although these illustrations are described in the context of determining that a handover condition is met based on distance considerations, these illustrations may also apply in the context of determining that a handover condition is met based on other considerations described herein, such as orientation considerations.

Figure 12A:
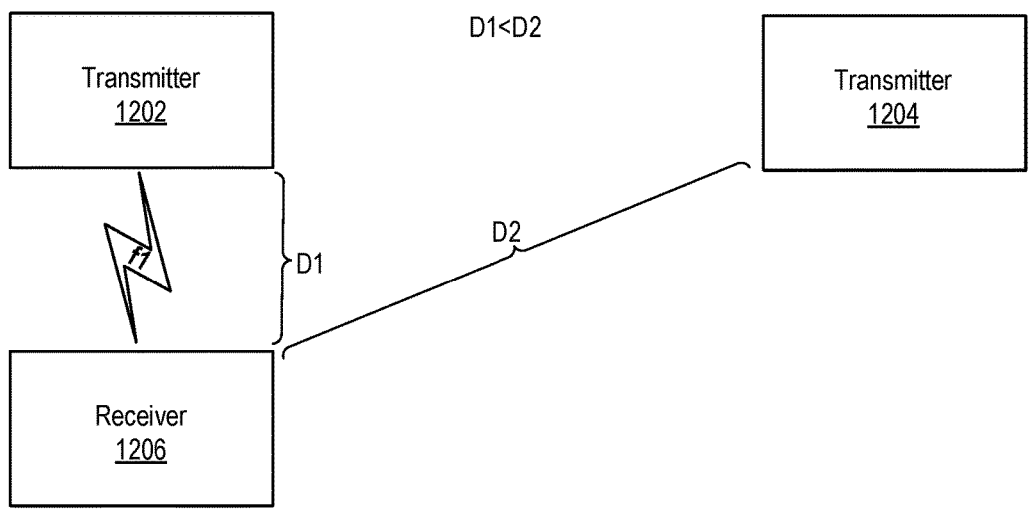
FIGS. 12A to 12D illustrate a handover that is facilitated using a make before break approach, according to an example embodiment.

As shown by FIG. 12A, the transmitter 1202 is providing electrical power to the receiver 1206 via first resonant coupling link using a first oscillation frequency f1. With this arrangement, a controller may determine a distance D1 between the receiver 1206 and the transmitter 1202 and may also determine a distance D2 between the receiver 1206 and the transmitter 1204. Then, the controller may determine that the distance D1 is less than the distance D2, and thus that a handover condition has not been met.

Figure 12B:
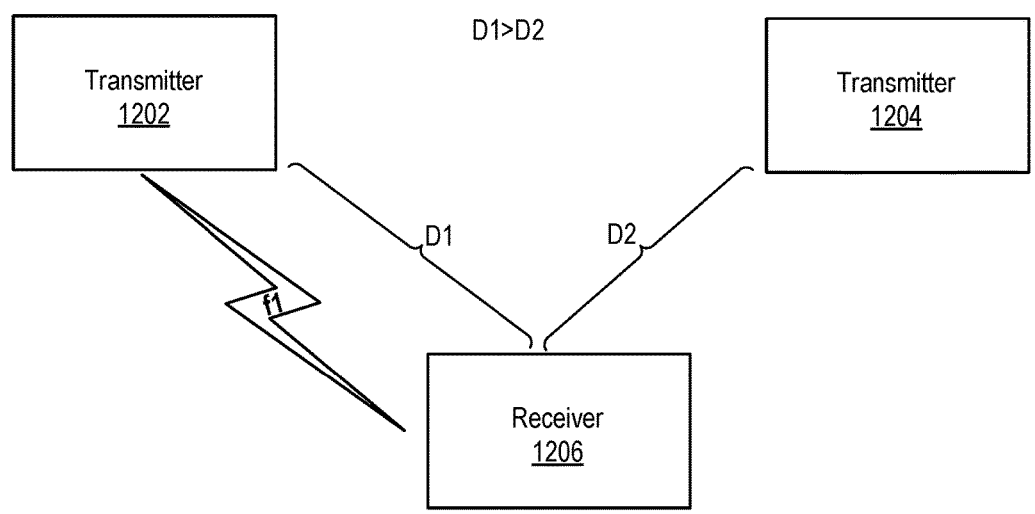

As shown by FIG. 12B, the receiver has moved to a new location in physical space, which is a location closer to the transmitter 1204 and further away from transmitter 1202. Here again, the controller may determine the distance D1 between the receiver 1206 and the transmitter 1202 and may also determine the distance D2 between the receiver 1206 and the transmitter 1204. In this case, however, the controller may determine that the distance D1 is greater than the distance D2, and thus that a handover condition has been met.

Figure 12C:
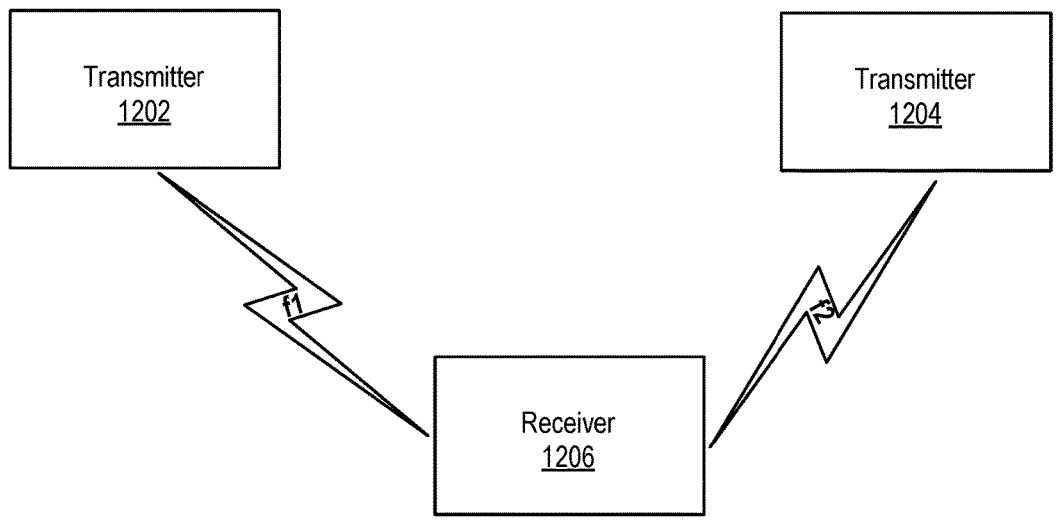

As shown by FIG. 12C, the controller has initiated a handover of the receiver 1206 to the transmitter 1204 in response determining that the handover condition has been met. As shown, the controller causes the transmitter 1202 to continue to provide electrical power to the receiver 1206 via first resonant coupling link using a first oscillation frequency f1 and also causes the transmitter 1204 to provide electrical power to the receiver 1206 via a second resonant coupling link using a second oscillation frequency f2, which could be the same as or different from frequency f1. In this way, both transmitters 1202-1204 provide electrical power to the receiver 1206 at substantially the same time, which may minimize disruption in power delivery during the handover.

Figure 12D:
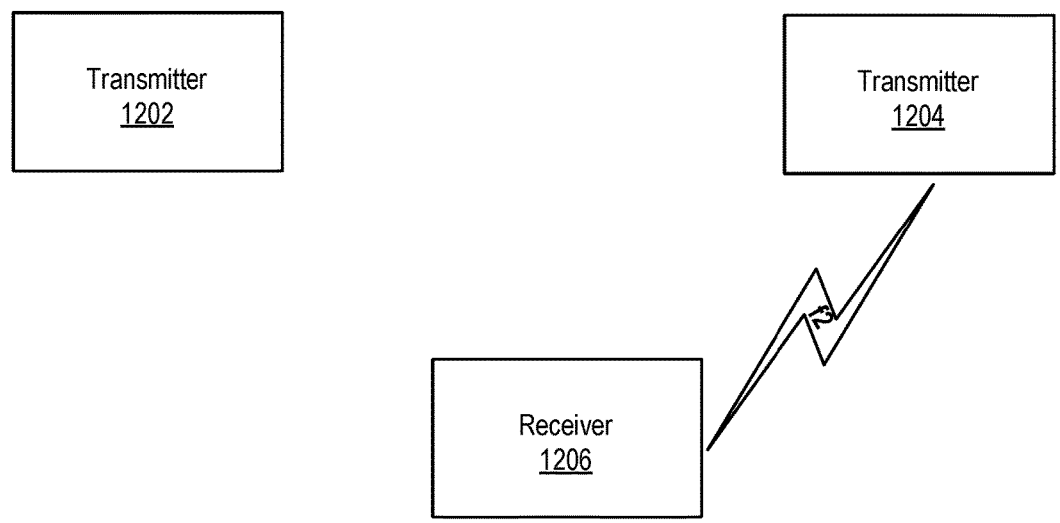

As shown by FIG. 12D, the controller may complete the handover such that the receiver 1206 ultimately receives power only from the transmitter 1204. In particular, the controller causes the transmitter 1202 to no longer provide electrical power to the receiver 1206 and causes the transmitter 1204 to continue to provide electrical power to the receiver 1206. Other illustrations are also possible.

In an example implementation, the transmitters and the receiver could each be respectively equipped with one or more transmit/receive resonators configured to resonate at one or more frequencies. Thus, the oscillation frequencies that the first and second transmitters use to provide electrical power to the receiver may be the same as one another or may be different from one another depending on what resonators the transmitters and receivers are equipped with.

For example, the controller may cause the second transmitter to use a transmit resonator that is configured to resonate at the same frequency at which a transmit resonator of the first transmitter resonates to provide electrical power to the receiver via the first wireless resonant coupling link. In doing so, the transmit resonator of the second transmitter may couple to a receive resonator of the receiver that is configured to resonate at that same frequency at issue, thereby establishing the second wireless resonant coupling link.

In some scenarios, however, the first and second transmitter may not be able to use the same frequency. For instance, the second transmitter has a transmit resonator that is configured to resonate at a second oscillation frequency, but does not have a transmit resonator that is configured to resonate at the first oscillation frequency at which a transmit resonator of the first transmitter resonates to provide electrical power to the receiver via the first wireless resonant coupling link. To help overcome this issue, a transmitter may be configured with a tunable transmit resonator that is operable to resonate at two or more frequencies, with the oscillating frequency being selectable by the transmitter from among those two or more frequencies. Additionally or alternatively, the controller may facilitate the handover by causing the receiver to use multiple receive resonators throughout the handover process.

In particular, the receiver may have two or more receive resonators so that the receiver could receive electrical power using multiple oscillation frequencies, such as substantially the same time or by using different frequencies respectively at different times. For instance, the receiver may have a first receive resonator that is configured to resonate at the first oscillation frequency and may also have a second receive resonator that is configured to resonate at the second oscillation frequency. With this arrangement, the first receive resonator may be coupled to the transmit resonator of the first transmitter via the first wireless resonant coupling link. Then, when the controller causes both the first and second transmitter to provide power to the receiver, the controller may cause the transmit resonator of the second transmitter to couple to the second receive resonator, thereby establishing the second wireless resonant coupling link. Other example implementations are also possible.

IV. Phase Determination and Control during Wireless Power Handover

In accordance with the present disclosure, the controller may engage in a phase-determination process when facilitating the handover. The phase-determination process may be used to determine first and second phases at which the first and second transmitters should provide electrical power to the receiver when they both provide electrical power to the receiver at substantially the same time in accordance with discussion above. Specifically, the controller may determine first and second phases that minimize extent of decrease in electrical power available to the receiver when the controller then causes both the first and second transmitters to respectively provide electrical power to the receiver at the determined first and second phases.

Generally, a phase of an oscillating wave may define a position of a point in time on a waveform cycle, which corresponds to a fraction of the complete cycle elapsed as measured from a specified reference point. In some embodiments, respective phases of oscillating waves may affect the manner in which those waves interact in physical space. Consequently, when two oscillating waves meet at a point in physical space, the oscillating waves may encounter interference in which the oscillating waves may superpose to form a resultant wave of greater, lower, or the same amplitude.

For instance, two oscillating waves of the same frequency may be in-phase or may be completely out of phase, which may ultimately affect the resultant wave. The oscillating waves are considered to be in-phase when respective crests of the oscillating waves meet at the same point. Such in-phase oscillating waves may constructively interfere to form a resultant wave with greater amplitude that is equal to the sum of the individual amplitudes of the respective oscillating waves. On the other hand, the oscillating waves are considered to be completely out of phase if a trough of one oscillating wave meets a crest of the other oscillating wave. Such completely out of phase oscillating waves may destructively interfere to form a resultant wave with a lower amplitude, which may involve a complete cancellation of the oscillating waves (i.e., a resultant wave having an amplitude of zero) if the individual oscillating waves are of the same amplitude.

In other situations, two oscillating waves of the same frequency may be partially out of phase, which could also affect the resultant wave in various ways. In particular, the oscillating waves are considered to be partially out of phase when a crest of the first oscillating wave meets a point on the second oscillating wave other than the second oscillating wave's crest or trough. Such partially out of phase oscillating waves may destructively and/or constructively interfere to form a resultant wave that could be have a greater, lower, or the same amplitude as one or both of the individual oscillating waves. Generally, the amplitude of the resultant wave may depend on the extent to which those oscillating waves are out of phase. In any case, however, the amplitude of this resultant wave is lower than amplitude of a resultant wave that would form if those same oscillating waves were to be in-phase in line with the discussion above.

Given that a resultant wave may have the greatest amplitude when two oscillating waves of the same frequency are in-phase, the controller may maximize the power that the receiver receives by causing both the first and second transmitters to provide electrical power to the receiver at substantially the same phase. In particular, assuming that the first and second oscillating frequencies are the same, if the oscillations of the first and second wireless resonant coupling links are in-phase at the receiver's location, then the power level that the receiver receives may be maximized. But if the oscillations of the first and second wireless resonant coupling links are partially or completely out of phase at the receiver's location, then the power level that the receiver receives may be less than the maximum power level that the receiver could receive if those oscillations were in-phase, and may even be a power level of zero in the case of completely out of phase oscillations.

To ensure that oscillations of the first and second wireless resonant coupling links are in-phase at the receiver's location, the controller may cause one or both transmitter to adjust phase (e.g., carry out a phase shift) of the oscillations if applicable. In particular, after the controller determines the phase(s) by engaging in the phase-determination process, the controller may cause one or both of the transmitters to adjust a respective phase at which the transmitter(s) provide electrical power to the receiver, so that the oscillations end up in-phase at the receiver's location. But if the oscillations are already in-phase at the receiver's location, then the controller may not cause any adjustments to the respective phase(s).

In some situations, as noted, the first oscillation frequency that the first transmitter uses to provide electrical power to the receiver may be different from the second oscillation frequency that the second transmitter uses to provide electrical power to the receiver. Generally, two oscillating waves of different frequencies could interfere in various ways to form various resultant waves. Specifically, although such oscillating waves cannot be completely in-phase, the resultant wave may depend on the respective phase of each oscillating wave. In this regard, different combinations of respective phases may help form different resultant waves of different amplitudes, and a certain combination of respective phases may help form a resultant wave with greatest amplitude of all possible resultant waves.

Given that a resultant wave may have the greatest amplitude when two oscillating waves of different frequencies provide for a certain combination of respective phases, the controller may cause the first and second transmitters to respectively provide electrical power to the receiver at first and second phases that help maximize the power that the receiver receives.

In particular, assuming that the first and second oscillating frequencies are different from one another, the oscillations of the first and second wireless resonant coupling links may be controlled so as to be at those first and second phases at the receiver's location where the power level that the receiver receives is maximized. Accordingly, after the controller determines those first and second phases by engaging in the phase-determination process, the controller may cause one or both of the transmitters to adjust the phase at which the transmitter(s) provide electrical power to the receiver so that the oscillations respectively end up at the first and second phases that maximize the power level provided to the receiver, thereby minimizing destructive interference. But if the oscillations are already at the first and second phases that maximize the power level, then the controller may not cause any adjustments to the phase(s).

In some implementations, to facilitate the phase-determination process in situations where the first and second oscillation frequencies are different, the controller may consider the second different frequency to be mathematically equivalent to the first frequency with a corresponding time-dependent phase shift. By substituting the second frequency with variables corresponding to the first frequency plus a time-dependent phase shift, the controller may then compare the first phase at which the first transmitter provides power to a second phase at which the second transmitter provides power with the addition of the time-dependent phase shift (e.g., compare (i) phase A to (ii) phase B plus time-dependent phase shift C(t)). In this way, the controller may determine the second phase to use that substantially minimizes the difference between the first phase and the second phase plus time-dependent phase shift (e.g., minimize (B+C(t))−(A)). Other situations are also possible.

Furthermore, when the controller carries out the phase-determination process, the controller may ensure that the second receiver initially provides electrical power to the receiver at a relatively low power level. Specifically, in line with the discussion above, the controller may cause both the first and second transmitters to provide electrical power to the receiver so as to minimize disruptions in providing electrical power to the receiver. Sometimes, however, the second transmitter may initially provide electrical power at a non-ideal phase that could result in a relatively high extent of destructive interference if the second transmitter were to provide electrical power at a relatively high power level. For this reason, the controller may minimize the extent of destructive interference during the phase-determination process by initially causing the second transmitter to provide electrical power to the receiver at a relatively low power level. Then, at some point after the phase-determination process is complete, the controller may cause the second transmitter to increase the provided power level and to provide electrical power at the determined phase at which destructive interference is minimized.

Accordingly, in an example implementation of this approach, while engaging in the phase-determination process, the controller may cause the first transmitter to provide electrical power to the receiver at a first power level and may cause the second transmitter to provide electrical power to the receiver at a second power level that is lower than the first power level. And at some point after completion of the phase-determination process, the controller may cause the second transmitter to provide electrical power to the receiver at a third power level that is higher than the second power level.

For example, the controller may cause the second transmitter to increase the provided power level over time (e.g., linearly) from the second power level to the third power level, so that the second transmitter then provides electrical power to the receiver at the third power level when the first transmitter stops providing electrical power to the receiver. In this example, the controller could also cause the first transmitter decrease the provided power level over time (e.g., also linearly) from the first power level to a lower fourth power level. In this manner, the controller may transition the power delivery to the receiver over time from the first transmitter to the second transmitter. Other examples are also possible.

Generally, the controller may carry out the phase-determination process using various approaches, some of which are described in detail below. Although certain approaches are described below, other approaches are possible as well without departing from the scope of the present disclosure. Moreover, the controller may carry out any feasible combination of these approaches when carrying out the phase-determination process.

A. Comparison of Utilized Phases

In an example approach, a controller may determine the first and second phases based on a comparison of phases actually being utilized by the transmitters. In particular, the controller may cause one transmitter at a time to provide electrical power to the receiver. In this way, the controller may cause the receiver to separately determine characteristics of electrical power provided by each transmitter, so that electrical power provided by the other transmitter does not hinder accurate evaluation of characteristics of electrical power provided by the given transmitter. These determined characteristics at issue may include a respective phase at which each transmitter respectively provides electrical power to the receiver. With this approach, the controller may determine and then compare the utilized phases so as to determine the phases that should be used.

More specifically, the controller may cause only the first transmitter to provide electrical power to the receiver during a first time period. During that first time period, the controller may also cause the receiver to determine a first-utilized phase at which the receiver receives electrical power from the first transmitter during that first time period. Then, the controller may cause only the second transmitter to provide electrical power to the receiver during a second time period. During that second time period, the controller may also cause the receiver to determine a second-utilized phase at which the receiver receives electrical power from the second transmitter during that second time period. In some embodiments, the receiver may determine utilized phases by applying signal processing techniques to evaluate a signal corresponding to the received power and/or by using a phase detector, among other options.

Once the receiver determines the first-utilized phase and the second-utilized phase, the receiver may report these determined phases to the controller (in a situation where the controller is not part of the receiver). And based on a comparison of the determined first utilized and second utilized phases, the controller may then determine the first phase at which the first transmitter should provide electrical power to the receiver and the second phase at which the second transmitter should provide electrical power to the receiver.

In one case, the controller may determine that the first-utilized phase is different from the second-utilized phase. Responsively, assuming that the above-mentioned first and second oscillation frequencies are the same, the controller may determine that the first and second transmitter should both provide electrical power to the receiver at the first-utilized phase. Alternatively, the controller may responsively determine that the first and second transmitter should both provide electrical power to the receiver at the second-utilized phase. In either implementation, the controller may effectively match the phases so as to ensure that the receiver receives in-phase signals.

In another case, the controller may determine that the first-utilized and second-utilized phases are the same matching phase. Responsively, again assuming that the above-mentioned first and second oscillation frequencies are the same, the controller may determine that the first and second transmitter should continue to provide electrical power to the receiver at the same matching phase. In this way, the controller effectively ensures that that the receiver continues to receive in-phase signals.

In yet another case, the first and second oscillation frequencies may be different from one another and thus the comparison of the utilized phases may be carried out in order to determine a phase adjustment for the purpose of minimizing destructive interference. In particular, the controller may determine adjustments to one or both of the utilized phases so as to result in first and second phases at which extent of available power is maximized in accordance with the discussion above. And once determined, the controller may then carry out those adjustments. But if the controller determines that the utilized phases already provide for maximized available power in accordance with the discussion above, then the controller may responsively determine that no adjustments should be carried out. Other cases are possible as well.

Figure 13A:
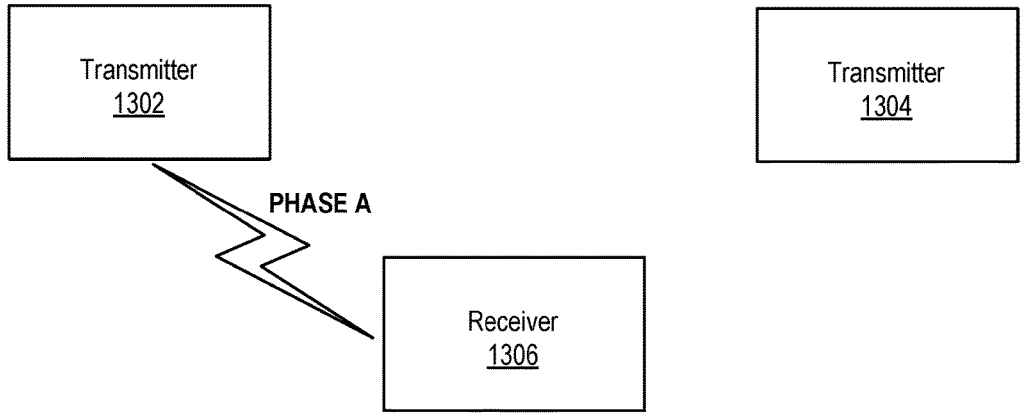
FIGS. 13A to 13C illustrate determination of phases based on a comparison of utilized phases, according to an example embodiment.
Figure 13B:
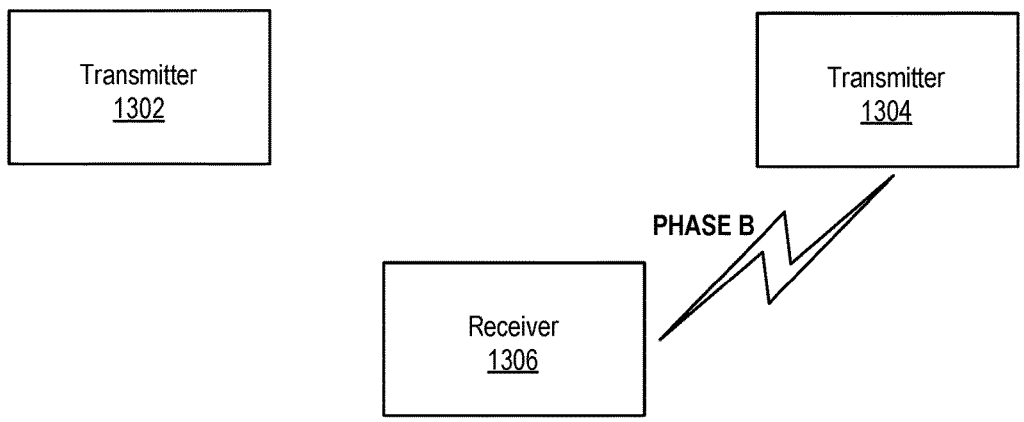
Figure 13C:
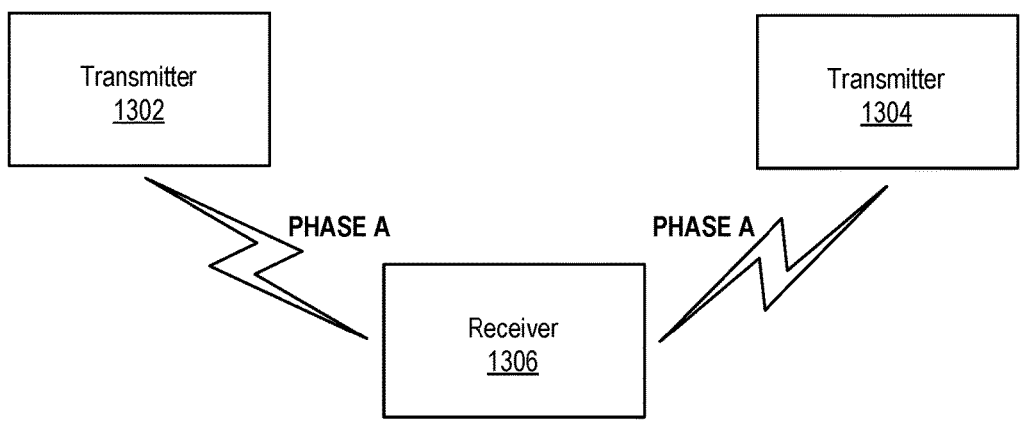

FIGS. 13A-13C next illustrate determination of phases based on a comparison of utilized phases. As illustrated by FIG. 13A, only the transmitter 1302 provides power to the receiver 1306 for some time period. During that time period, the receiver 1306 determines that the receiver is receiving electrical power from the transmitter 1302 at a representative phase A. As illustrated by FIG. 13B, at a later point in time, only the transmitter 1304 provides power to the receiver 1306 for some time period. During that later time period, the receiver 1306 determines that the receiver is receiving electrical power from the transmitter 1306 at a representative phase B. Finally, as illustrated by FIG. 13C, both transmitters 1302-1304 provide electrical power to the receiver 1306 at the phase A, thereby helping to minimize destructive interference. Other illustrations are also possible.

B. Evaluation of Pre-Handover Phase

In another example approach, a controller may determine the first and second phases that should be used based on evaluation of a pre-handover phase. In particular, before facilitating the handover and perhaps even before determining that a handover condition is met, the controller may cause the receiver to determine a pre-handover phase at which the receiver receives electrical power from the first transmitter. And once the controller then engages in the phase-determination process, the controller may determine that the second transmitter should also provide electrical power to the receiver at the pre-handover phase. As such, the controller may then cause the first and second transmitters to respectively provide electrical power to the receiver at the determined pre-handover phase. In this way, the controller effectively ensures that the second transmitter's phase matches up to the phase at which the first transmitter has already been providing electrical power to the receiver.

In an example implementation of this approach, the controller may continuously or from time-to-time cause the receiver to determine the phase at which the receiver receives electrical power from the first transmitter. And the receiver may report such determined phases to the controller so that the controller has information about the most recent phase at which the receiver receives electrical power from the first transmitter. Then, once the controller determines that the handover condition is met or once the controller begins to facilitate the handover, the controller may then determine that the second transmitter should provide electrical power to the receiver at that most recently determined phase, so as to effectively match up to the first transmitter's phase.

In some cases, the first and second oscillation frequencies may be different from one another and thus the pre-handover phase may be used by the controller as basis to the second transmitter's second phase for the purpose of minimizing destructive interference. In particular, the controller may determine the second phase at which destructive interference is minimized when received in combination with the first transmitter's pre-handover phase. And once determined, the controller may then cause the first transmitter to continue to provide electrical power to the receiver at the pre-handover phase and may cause the second transmitter to electrical provide power to the receiver at the determined second phase, thereby minimizing destructive interference. Other cases are also possible.

Figure 14A:
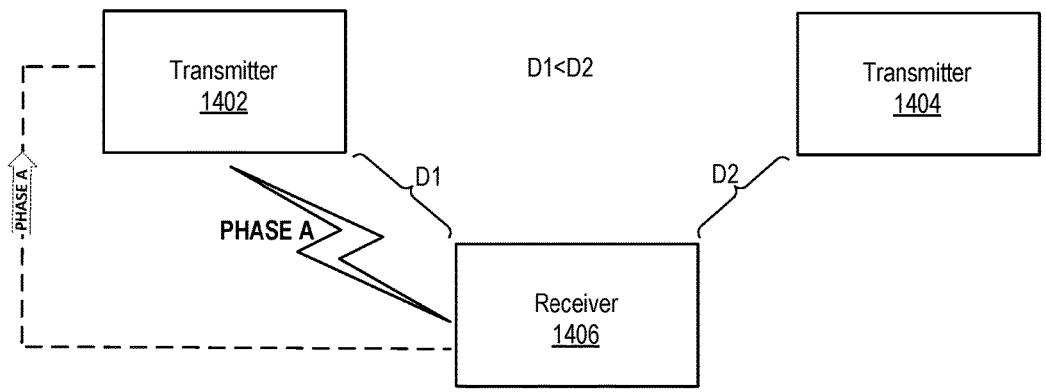
FIGS. 14A to 14C illustrate determination of phases based on evaluation of a pre-handover phase, according to an example embodiment.
Figure 14B:
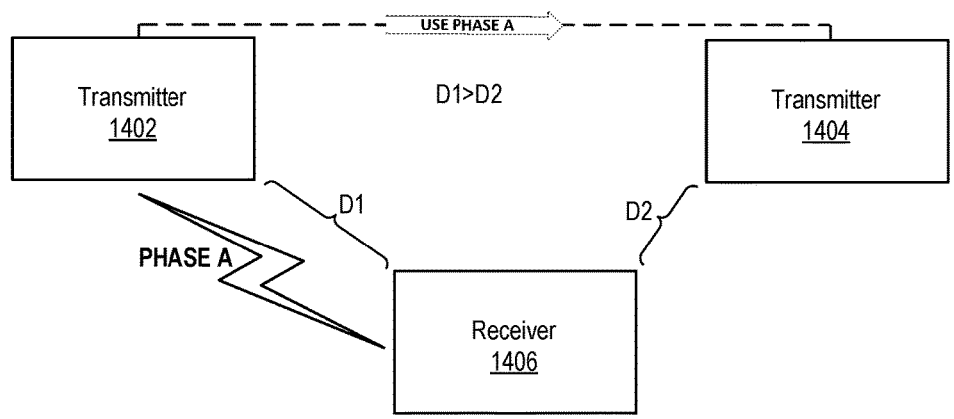
Figure 14C:
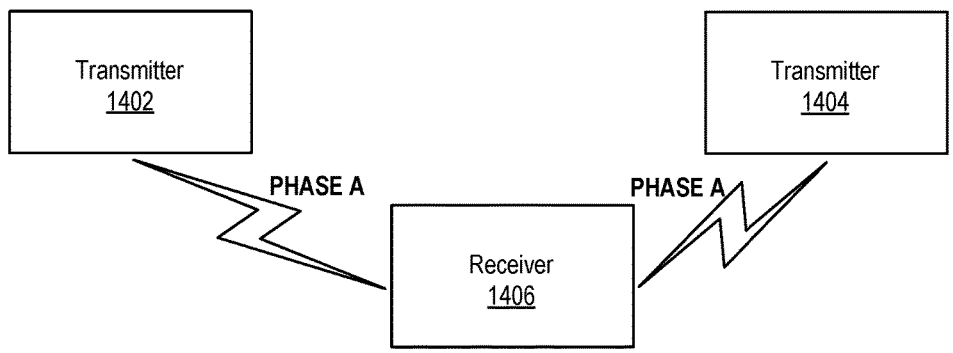

FIGS. 14A-14C next illustrate determination of phases based on evaluation of a pre-handover phase.

As shown by FIG. 14A, the transmitter 1402 is providing electrical power to the receiver 1406 at a phase A. As also shown, the receiver 1406 may determine that the receiver 1406 is receiving electrical power from the transmitter 1402 at phase A and may report this phase A to the transmitter 1402 via a side-channel communication link. Moreover, in line with the discussion above with regards to FIGS. 12A-12D, FIG. 14A shows that the distance D1 is less than the distance D2, thereby indicating that a handover condition has not been met.

As shown by FIG. 14B, again in line with the discussion above with regards to FIGS. 12A-12D, the receiver 1406 has moved and that the distance D1 is now greater than the distance D2, thereby indicating that a handover condition has been met. FIG. 14B shows that, in response to determining that the handover condition has been met, the transmitter 1402 reports the most recently used phase A to the transmitter 1404, so that the transmitter 1406 can determine the phase at which to provide electrical power to the receiver 1406. As such, the transmitter 1406 may determine that it should also provide electrical power to the receiver 1406 at phase A so as to effectively match the phase utilized by the transmitter 1402.

Finally, as shown by FIG. 14C, again in line with the discussion above with regards to FIGS. 12A-12D, both transmitters 1402-1404 provide electrical power to the receiver 1406 at substantially the same time, which may minimize interruption in power delivery during the handover. In doing so, the transmitters 1402-1404 provide electrical power to the receiver 1406 at the phase A, thereby helping to minimize destructive interference. Other illustrations are also possible.

C. Evaluation of a Position of the Receiver

In yet another example approach, a controller may determine the first and second phases based on evaluation of the position of the receiver. In particular, the receiver may be positioned at a first distance away from the first transmitter and at second distance away from the second transmitter. These distances may affect a timing with which the transmitters may need to respectively provide electrical power to the receiver in order for the receiver to receive that electrical power at first and second phases that minimize power destructive interference. In some embodiments, the timing at issue may be a starting position of a point in time on a waveform cycle, which is adjustable in accordance with a phase shift of the electrical power's oscillation. As such, the controller may determine information related to a position of the receiver relative to the first and second transmitters and may then use that information as basis for determining the respective timings (e.g., in accordance with phase shifts) and thus the first and second phases at which the receiver should receive electrical power.

In this regard, the information indicative of the position of the receiver may take various forms and thus the controller may determine the receiver's position based on that information. For example, the information indicative of the position of the receiver may include: a coupling factor of the first wireless resonant coupling link, a coupling factor of the second wireless resonant coupling link, a received signal strength of communications over a first side-channel communication link between the receiver and the first transmitter, a received signal strength of communications over a second side-channel communication link between the receiver and the second transmitter, a determined distance between the first transmitter and the receiver, a determined distance between the second transmitter and the receiver, and/or a reported GPS location of the receiver, among others.

Furthermore, the controller may cause the first and second transmitter to share via a side-channel communication link the information indicative of the receiver's position, so that the first and second phases could be determined based on the shared information. In particular, the controller may cause first transmitter to determine information indicative of the position of the receiver relative to the first transmitter and to share that information with the second transmitter. Additionally or alternatively, the controller may cause the second transmitter to determine information indicative of the position of the receiver relative to the second transmitter and to share that information with the first transmitter. Then, the controller may cause at least one of the transmitters to use that shared information as basis for adjusting the timing with which that transmitter respectively provides electrical power to the receiver in order for the receiver to receive that electrical power at phases that minimize destructive interference.

By way of example, the second transmitter may receive from the first transmitter information indicating a first coupling factor of the first wireless resonant coupling link between the receiver and the first transmitter and also indicating the first oscillation frequency that the first transmitter uses. Also, the second transmitter may determine a second coupling factor of the second wireless resonant coupling link between the receiver and the second transmitter and may also determine the second oscillation frequency that the second transmitter uses.

Given that the first coupling factor is indicative of a distance between the first transmitter and the receiver, the second transmitter may use that first coupling factor and the first oscillation frequency to determine a first phase at which the receiver receives electrical power from the first transmitter. Based on that determined first phase, the second transmitter may determine a second phase at which the receiver should receive electrical power from the second transmitter in order for destructive interference to be minimized. For instance, assuming that the first and second oscillation frequencies are the same, the second transmitter may determine that the first and second phases should be the same so as to result in in-phase signals.

Thus, given that the second coupling factor is indicative of a distance between the second transmitter and the receiver, the second transmitter may use that second coupling factor as basis for determining a phase shift to the oscillations of the provided electrical power, so that the receiver will receive electrical power from the second transmitter at the determined second phase. As such, the second transmitter may then apply that determined phase shift in accordance with determination, thereby helping to minimize destructive interference. Other examples are also possible.

Figure 15A:
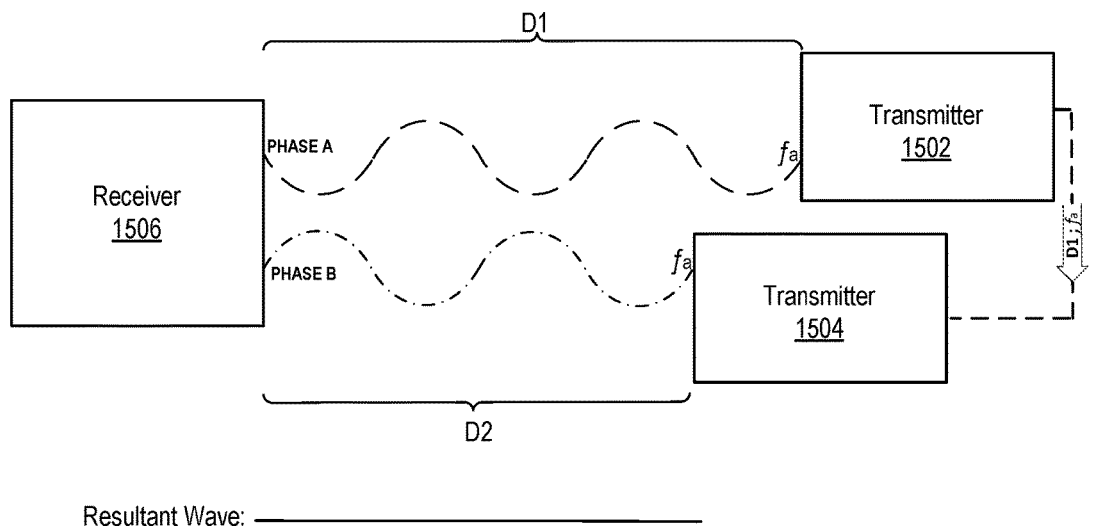
FIGS. 15A to 15B illustrate determination of phases based on evaluation of a position of a receiver, according to an example embodiment.
Figure 15B:
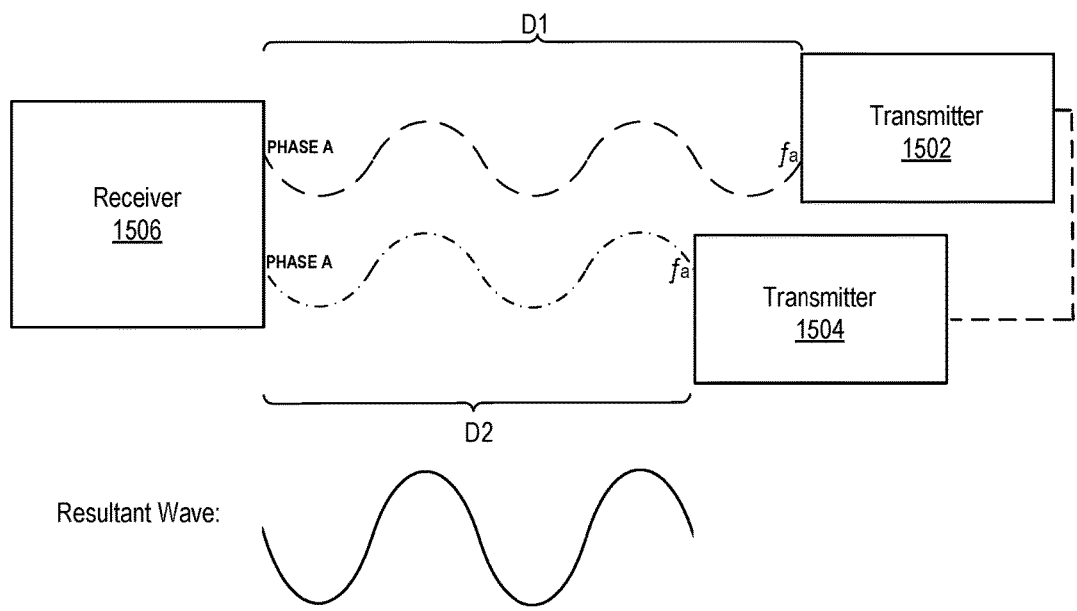

FIGS. 15A-15B next illustrate determination of phases based on evaluation of the position of the receiver.

As shown in FIG. 15A, the receiver 1506 is positioned at a distance D1 away from the transmitter 1502 and at a distance D2 away from the transmitter 1504. Both transmitters 1502-1504 are shown to provide electrical power to the receiver 1506 using an oscillation frequency fa. With the arrangement, the receiver 1506 receives electrical power from the transmitter 1502 at phase A. And if the receiver 1506 were to also receive electrical power from transmitter 1504, the receiver 1506 would receive that electrical power at phase B, which is shown to be completely opposite to phase A. Consequently, this situation would amount to the waves being completely out of phase at the receiver 1506 and thus destructively interfering such that the resultant wave is at zero amplitude, thereby causing the receiver 1506 to receive no power or less power.

As also shown in FIG. 15A, the transmitter 1502 shares information with the transmitter 1504 over a side-channel communication link in accordance with the discussion above. In particular, the transmitter 1502 informs the transmitter 1504 of the distance D1 between the transmitter 1502 and the receiver 1506 and also informs the transmitter 1504 of the frequency fa that the transmitter 1502 uses. Accordingly, the transmitter 1504 may determine based on D1 and fa that the receiver 1506 receives electrical power from the transmitter 1502 at phase A.

Furthermore, the transmitter 1504 may determine the distance D2 between the transmitter 1504 and the receiver 1502 and may determine that the transmitter 1504 also uses the frequency fa. And based on the distance D2 and the fa, the transmitter 1504 may determine that the receiver 1502 receives electrical power from the transmitter 1502 at phase B. With this information, the transmitter 1504 may then determine that phases A and B are different by a phase difference of 180°. Thus, the transmitter 1504 may determine that the transmitter 1504 should apply a 180° phase shift to the oscillation of its provided electrical power so that the receiver 1506 ends up receiving in-phase signals.

As such, FIG. 15B shows that the transmitter 1504 has applied the 180° phase shift and that, as a result, the receiver 1506 is receiving electrical power from the transmitter 1502 at phase A and is also receiving electrical power from the transmitter 1504 at phase A. Given that the waves are shown to be in-phase due to the phase shift, the waves constructively interfere such that the resultant wave is at greater amplitude, thereby minimizing destructive interference. Other illustrations are also possible.

D. Application of a Phase Sweep

In yet another example approach, the controller may determine the phases based on application of a phase sweep. In particular, while the first transmitter provides electrical power to the receiver, the controller may cause the second transmitter to carry out a phase sweep in which the second transmitter provides electrical power to the receiver at a plurality of phases over a time period. Moreover, the controller may also cause the receiver to determine the highest total power level that the receiver receives during that time period. In some embodiments, the receiver may receive that highest total power level when the second transmitter provides electrical power to the receiver at a particular phase, which indicates that this particular phase is a phase that would minimize destructive interference and thus increase extent of power available to the receiver.

In this approach, the controller may thus determine the particular phase at which the receiver receives electrical power from the second transmitter when the receiver receives that highest total power level. For example, the receiver may report to the controller a mapping of the received total power levels over the time and the corresponding phases at which the receiver received electrical power over time. Based on that mapping, the controller may thus determine the particular phase that corresponds to the highest received total power level. As such, the controller may then determine that the second transmitter should provide electrical power to the receiver at the determined particular phase and may cause the second transmitter to do so, thereby minimizing destructive interference.

Figure 16A:
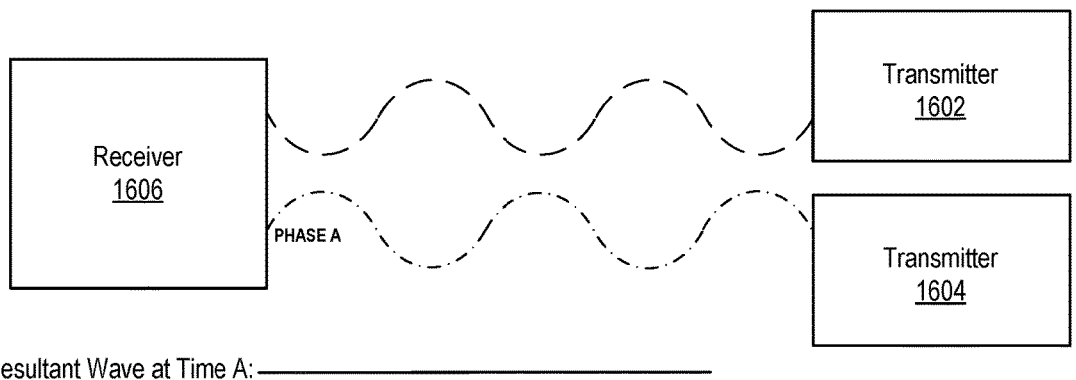
FIGS. 16A to 16C illustrate determination of phases based on application of a phase sweep, according to an example embodiment.
Figure 16B:
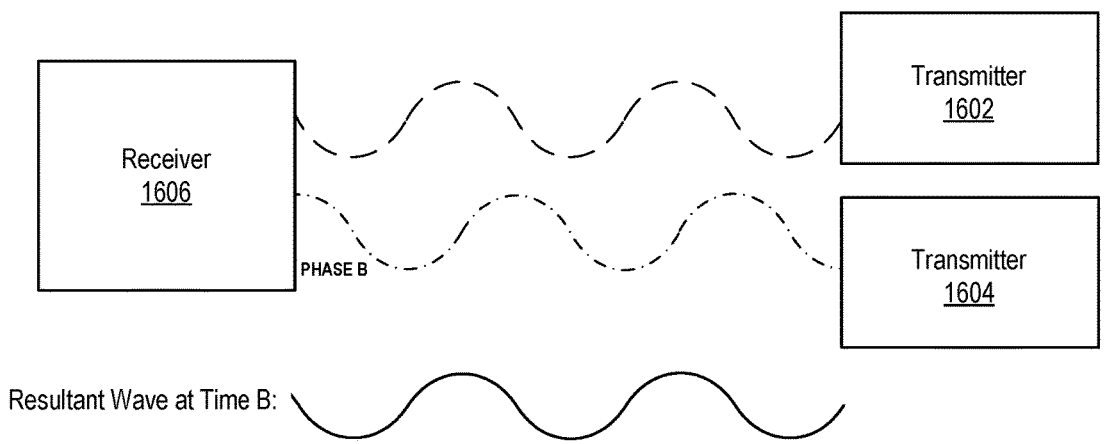
Figure 16C:
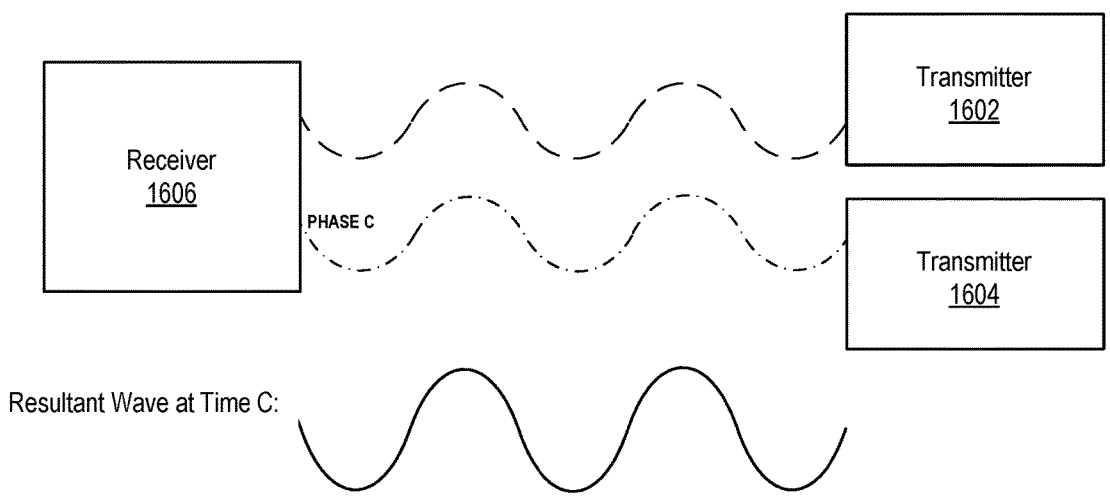

FIGS. 16A-16C next illustrate determination of phases based on application of a phase sweep. As shown, while the transmitter 1602 provides electrical power to the receiver 1606, the transmitter 1604 carries out a phase sweep in which the transmitter 1604 provides electrical power to the receiver 1606 at several phases A, B, and C over time A to C.

As shown by FIG. 16A, the transmitter 1604 provides electrical power to the receiver 1606 at phase A, which is shown to be completely opposite to a phase at which the receiver 1606 receives electrical power from the transmitter 1602. This situation would amount to the waves being completely out of phase and thus destructively interfering such that the resultant wave is at zero amplitude, thereby giving rise to a complete decrease of extent of power available to the receiver. Accordingly, the receiver 1606 may determine that the receiver 1606 is receiving a first power level of zero when the receiver 1606 receives electrical power from the transmitter 1604 at phase A, and may report so to the controller.

As shown by FIG. 16B, the transmitter 1604 provides electrical power to the receiver 1606 at phase B, which is shown to be different from a phase at which the receiver 1606 receives electrical power from the transmitter 1602. This situation would amount to the waves being partially out of phase and thus partially destructively interfering such that the resultant wave is at a lesser but at non-zero amplitude, thereby giving rise to a partial decrease of extent of power available to the receiver. Accordingly, the receiver 1606 may determine that the receiver 1606 is receiving a second power level (higher than the first power level of zero) when the receiver 1606 receives electrical power from the transmitter 1604 at phase B, and may report so to the controller.

As shown by FIG. 16C, the transmitter 1604 provides electrical power to the receiver 1606 at phase C, which is shown to be the same as a phase at which the receiver 1606 receives electrical power from the transmitter 1602. This situation would amount to the waves being in-phase and thus constructively interfering such that the resultant wave is at greatest amplitude, thereby minimizing destructive interference. Accordingly, the receiver 1606 may determine that the receiver 1606 is receiving a third power level (higher than the first and second power levels) when the receiver 1606 receives electrical power from the transmitter 1604 at phase C, and may report so to the controller.

Based on the information that the receiver 1606 reports to the controller, the controller may determine that the receiver 1606 receives the highest power level (third power level) when the receiver 1606 receives electrical power from the transmitter 1604 at phase C. Consequently, the controller may determine that the transmitter 1604 should provide electrical power to the receiver 1606 at phase C, and may then cause the transmitter 1604 to do so, thereby minimizing destructive interference. Other illustrations are also possible.

V. Illustrative Method

FIG. 17 is a flowchart illustrating a method 1700, according to an example implementation. In particular, method 1700 may be implemented to carry out a handover of a receiver from a first transmitter to a second transmitter, with the handover including a phase-determination process in accordance with the discussion above.

Method 1700 shown in FIG. 17 (and other processes and methods disclosed herein) presents a method that can be implemented within an arrangement involving, for example, any of the systems shown in any one of FIGS. 1-16 (or more particularly by one or more components or subsystems thereof, such as by a processor and a non-transitory computer-readable medium having instructions that are executable to cause the system to perform functions described herein). Additionally or alternatively, method 1700 may be implemented within any other arrangements and systems.

Method 1700 and other processes and methods disclosed herein may include one or more operations, functions, or actions as illustrated by one or more of blocks 1702-1706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1700 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1700 and other processes and methods disclosed herein, each block in FIG. 17 may represent circuitry that is wired to perform the specific logical functions in the process.

At block 1702, method 1700 involves causing a first transmitter to provide electrical power to a receiver via a first wireless resonant coupling link using a first oscillation frequency. Additionally, at block 1704, method 1700 involves determining that a handover condition is met. Further, at block 1706, method 1700 involves, in response to determining that the handover condition is met, facilitating a handover to a second transmitter.

In accordance with the discussion above, the handover may include engaging in a phase-determination process to determine a first phase at which the first transmitter should provide electrical power to the receiver and a second phase at which the second transmitter should provide electrical power to the receiver. Also, the handover may include causing the first transmitter to provide electrical power to the receiver at the determined first phase while also causing the second transmitter to provide electrical power to the receiver at the determined second phase, where the second transmitter provides electrical power to the receiver at the determined second phase via a second wireless resonant coupling link using a second oscillation frequency. Furthermore, the handover may include, after causing the first transmitter to provide electrical power to the receiver at the determined first phase while causing the second transmitter to provide electrical power to the receiver at the determined second phase, causing the first transmitter to no longer provide electrical power to the receiver and causing the second transmitter to continue to provide electrical power to the receiver.

VI. Additional Handover Features

In a further aspect, various other features may be implemented as part of the handover described herein. Although certain such features are described below, other features are possible as well without departing from the scope of the present disclosure.

A. Handover Prediction

In an example implementation, the controller may determine a future time at which the controller should facilitate handover of the receiver, and the controller may do so at that future time. In particular, the controller may determine a current location of the receiver and may also determine that the receiver is moving in a given direction and at a given rate (e.g., speed). The controller may then use such information to predict a future time at which the receiver may be positioned at a location where a handover condition is to be met (e.g., a location at which a coupling factor of the first wireless resonant coupling link is expected to be below a threshold). Thus, the controller may determine that handover of the receiver should be facilitated when the receiver is positioned at that location at the future time, and may then facilitate the handover at that future time. In this way, the controller may proactively determine when handovers should be facilitated, thereby avoiding disruptions in power reception at the receiver, among other outcomes.

B. Authentication During Handover

In line with the discussion above, prior to transferring power to the receiver, the first transmitter may carry out an authentication process to authenticate the receiver, so as to avoid provision of power to unintended recipients. As part of the authentication process, the receiver may provide any type of information and/or acknowledgement required by the first transmitter to authenticate the receiver, such as by providing an authentication code, a message, and/or a key to the first transmitter.

In an example implementation, when a handover of the receiver to the second transmitter is facilitated, the second transmitter may not carry out an authentication process in which the receiver needs to provide any type of information and/or acknowledgement required by the second transmitter to authenticate the receiver. Rather, the first transmitter may send to the second receiver, via a side-channel communication link, any information/acknowledgement provided by the receiver to the first transmitter when the first transmitter carried out the authentication process to authenticate the receiver. Additionally or alternatively, the first transmitter may send to the second receiver an indication that the receiver has already been authenticated. Thus, the second transmitter may authenticate the receiver based on the information/indication received from the first transmitter. In this way, a complete authentication process does not necessarily need to be carried out during each handover, thereby helping to conserve resources of the wireless power system.

C. Selection of a Transmitter for Handover

In an example implementation, the controller may determine that two or more transmitters are candidate transmitters to which the receiver could be handed over from the first receiver, and thus the controller may select one of these transmitters as the second transmitter to which to hand over the receiver. In doing so, the controller may select the second transmitter based on one or more of various possible factors. Although example factors are described below, other factors are also possible.

In one example, the controller may select, from among the candidate transmitters, the transmitter having the highest available power capacity. In another example, the controller may select, from among the candidate transmitters, the transmitter that has allocated the least extent of power to other receivers. In yet another example, the controller may select, from among the candidate transmitters, the transmitter capable of providing the highest coupling to the receiver. In yet another example, the controller may select, from among the candidate transmitters, the transmitter that is currently providing power to the lowest quantity of other receivers. Other examples are also possible.

D. Use of a Feedback Loop

In an example implementation, the controller may apply a feedback loop to substantially maintain use of a certain metric, such as a determined phase or select oscillation frequency, over time, thereby avoiding significant drift of that metric over time, For example, once a phase to be used has been determined and the controller causes the transmitters to respectively provide power at the determined phase, the controller may apply at least one feedback loop to maintain the determined phase over time. In this way, the phase at which the transmitters respectively provide power to the receiver may not significantly drift/change over time. Other examples are also possible.

VII. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method comprising: causing a first transmitter to provide electrical power to a receiver via a first wireless resonant coupling link using a first oscillation frequency; determining that a handover condition is met; and in response to determining that the handover condition is met, facilitating a handover to a second transmitter, wherein the handover comprises:

engaging in a phase-determination process to determine a first phase at which the first transmitter should provide the electrical power to the receiver and a second phase at which the second transmitter should provide the electrical power to the receiver;

causing the first transmitter to provide the electrical power to the receiver at the determined first phase while also causing the second transmitter to provide the electrical power to the receiver at the determined second phase, wherein the second transmitter provides the electrical power to the receiver at the determined second phase via a second wireless resonant coupling link using a second oscillation frequency; and after causing the first transmitter to provide the electrical power to the receiver at the determined first phase while causing the second transmitter to provide the electrical power to the receiver at the determined second phase, causing the first transmitter to no longer provide the electrical power to the receiver and causing the second transmitter to continue to provide the electrical power to the receiver.

2. The method of claim 1, wherein engaging in the phase-determination process to determine the first and second phases comprises determining the first and second phases that minimize destructive interference when causing the first transmitter to provide the electrical power to the receiver while also causing the second transmitter to provide the electrical power to the receiver.

3. The method of claim 1, wherein engaging in the phase-determination process occurs while causing the first transmitter to provide the electrical power to the receiver at a first power level and causing the second transmitter to provide the electrical power to the receiver at a second power level that is lower than the first power level, and wherein causing the second transmitter to continue to provide the electrical power to the receiver comprises causing the second transmitter to continue to provide the electrical power to the receiver at a third power level that is higher than the second power level.

4. The method of claim 1, wherein engaging in the phase-determination process comprises: causing only the first transmitter to provide the electrical power to the receiver during a first time period; while causing only the first transmitter to provide electrical power to the receiver during the first time period, causing the receiver to determine a first-utilized phase at which the receiver receives the electrical power from the first transmitter during the first time period;
  causing only the second transmitter to provide the electrical power to the receiver during a second time period that is different from the first time period;
  while causing only the second transmitter to provide the electrical power to the receiver during the second time period, causing the receiver to determine a second-utilized phase at which the receiver receives the electrical power from the second transmitter during the second time period; and based on a comparison of the determined first-utilized and second-utilized phases, determining the first phase at which the first transmitter should provide the electrical power to the receiver and the second phase at which the second transmitter should provide the electrical power to the receiver.

5. The method of claim 4, wherein determining, based on a comparison of the determined first-utilized and second-utilized phases, the first phase at which the first transmitter should provide the electrical power to the receiver and the second phase at which the second transmitter should provide the electrical power to the receiver comprises:
  determining that the first-utilized phase is different from the second-utilized phase; and
  in response to determining that the first-utilized phase is different from the second-utilized phase, determining that the first and second transmitters should both provide the electrical power to the receiver at the first-utilized phase, and
  wherein causing the first transmitter to provide the electrical power to the receiver at the determined first phase while also causing the second transmitter to provide the electrical power to the receiver at the determined second phase comprises causing the first transmitter to continue to provide the electrical power to the receiver at the first-utilized phase and causing the second transmitter to also provide the electrical power to the receiver at the first-utilized phase.

6. The method of claim 4, wherein determining, based on a comparison of the determined first-utilized and second-utilized phases, the first phase at which the first transmitter should provide the electrical power to the receiver and the second phase at which the second transmitter should provide the electrical power to the receiver comprises:
  determining that the first-utilized phase is different from the second-utilized phase; and
  in response to determining that the first-utilized phase is different from the second-utilized phase, determining that the first and second transmitters should both provide the electrical power to the receiver at the second-utilized phase, and
  wherein causing the first transmitter to provide the electrical power to the receiver at the determined first phase while also causing the second transmitter to provide the electrical power to the receiver at the determined second phase comprises causing the first transmitter to adjust transmission of the electrical power to provide the electrical power to the receiver at the second-utilized phase rather than at the first-utilized phase and causing the second transmitter to continue to provide the electrical power to the receiver at the second-utilized phase.

7. The method of claim 4, wherein determining, based on a comparison of the determined first-utilized and second-utilized phases, the first phase at which the first transmitter should provide the electrical power to the receiver and the second phase at which the second transmitter should provide the electrical power to the receiver comprises:
  determining that the first-utilized and second-utilized phases are the same matching phase; and
  in response to determining that the first-utilized and second-utilized phases are the same matching phase, determining that the first and second transmitters should continue to provide the electrical power to the receiver at the same matching phase, and
  wherein causing the first transmitter to provide the electrical power to the receiver at the determined first phase while also causing the second transmitter to provide the electrical power to the receiver at the determined second phase comprises causing both the first and second transmitters to continue to provide the electrical power to the receiver at the same matching phase.

8. The method of claim 1, further comprising:
  before facilitating the handover, causing the receiver to determine a pre-handover phase at which the receiver receives the electrical power from the first transmitter,
  wherein engaging in the phase-determination process comprises determining that the second transmitter should also provide the electrical power to the receiver at the determined pre-handover phase, and wherein causing the first transmitter to provide the electrical power to the receiver at the determined first phase while also causing the second transmitter to provide the electrical power to the receiver at the determined second phase comprises causing both the first and second transmitters to respectively provide the electrical power to the receiver at the determined pre-handover phase.

9. The method of claim 1, wherein engaging in the phase-determination process comprises:
  determining information indicative of a position of the receiver relative to the first and second transmitters; and based on the determined information indicative of the position of the receiver relative to the first and second transmitters, determining the first phase at which the first transmitter should provide the electrical power to the receiver and the second phase at which the second transmitter should provide the electrical power to the receiver.

10. The method of claim 9, wherein the first transmitter and the second transmitter are configured to engage in communications via a side-channel communication link, wherein determining information indicative of a position of the receiver relative to the first and second transmitters comprises causing the first and second transmitters to share via the side-channel communication link the information indicative of the position of the receiver relative to the first and second transmitters, and wherein determining the first and second phases is based on the shared information.

11. The method of claim 9, wherein the information indicative of the position of the receiver comprises at least one of the following: a coupling factor of the first wireless resonant coupling link, a coupling factor of the second wireless resonant coupling link, a received signal strength of communications over a first side-channel communication link between the receiver and the first transmitter, a received signal strength of communications over a second side-channel communication link between the receiver and the second transmitter, a determined distance between the first transmitter and the receiver, a determined distance between the second transmitter and the receiver, or a reported Global Positioning System (GPS) location of the receiver.

12. The method of claim 1, wherein engaging in the phase-determination process comprises: while causing the first transmitter to provide the electrical power to the receiver, causing the second transmitter to carry out a phase sweep in which the second transmitter provides the electrical power to the receiver at a plurality of phases over a particular time period;
 causing the receiver to determine the highest total power level that the receiver receives over the particular time period;
 determining a particular phase, from among the plurality of phases, at which the receiver receives the electrical power from the second transmitter when the receiver receives the highest total power level; and
 determining that the second transmitter should provide the electrical power to the receiver at the determined particular phase,
 wherein causing the second transmitter to provide the electrical power to the receiver at the determined second phase comprises causing the second transmitter to provide the electrical power to the receiver at the determined particular phase.

13. The method of claim 1, further comprising:
 determining a coupling factor of the first wireless resonant coupling link,
 wherein determining that the handover condition is met comprises determining that the coupling factor of the first wireless resonant coupling link is below a threshold coupling factor.

14. The method of claim 1, further comprising:
 determining a distance between the first transmitter and the receiver,
 wherein determining that the handover condition is met comprises determining that the distance between the first transmitter and the receiver is greater than a threshold distance.

15. The method of claim 1, further comprising:
 determining a relative orientation between the first transmitter and the receiver,
 wherein determining that the handover condition is met comprises determining that the relative orientation between the first transmitter and the receiver is greater than a threshold relative orientation.

16. The method of claim 1, further comprising:
 determining a coupling factor of the second wireless resonant coupling link,
 wherein determining that the handover condition is met comprises determining that the coupling factor of the second wireless resonant coupling link is above a threshold coupling factor.

17. The method of claim 1, further comprising:
 determining a distance between the second transmitter and the receiver,
 wherein determining that the handover condition is met comprises determining that the distance between the second transmitter and the receiver is less than a threshold distance.

18. The method of claim 1, further comprising:
 determining a relative orientation between the second transmitter and the receiver,
 wherein determining that the handover condition is met comprises determining that the relative orientation between the second transmitter and the receiver is less than a threshold relative orientation.

19. The method of claim 1, wherein the first transmitter comprises a first transmit resonator, wherein the first transmit resonator is coupled to a receive resonator of the receiver via the first wireless resonant coupling link, and wherein the first transmit resonator and the receive resonator are each configured to resonate at the first oscillation frequency.

20. The method of claim 1, wherein the second transmitter comprises a second transmit resonator, wherein the second transmit resonator is coupled to a receive resonator of the receiver via the second wireless resonant coupling link, and wherein the second transmit resonator and the receive resonator are each configured to resonate at the second oscillation frequency.

21. The method of claim 1, wherein the first and second oscillation frequencies are the same oscillation frequency.

22. A wireless power transmission system comprising:
 a first transmitter;
 a second transmitter; and
 a controller configured to:
 cause the first transmitter to provide electrical power to a receiver via a first wireless resonant coupling link using a first oscillation frequency;
 determine that a handover condition is met; and
 in response to determining that the handover condition is met, facilitate a handover to the second transmitter, wherein the handover comprises:
 engaging in a phase-determination process to determine a first phase at which the first transmitter should provide the electrical power to the receiver and a second phase at which the second transmitter should provide the electrical power to the receiver;
 causing the first transmitter to provide the electrical power to the receiver at the determined first phase while also causing the second transmitter to provide the electrical power to the receiver at the determined second phase, wherein the second transmitter provides the electrical power to the receiver at the determined second phase via a second wireless resonant coupling link using a second oscillation frequency; and
 after causing the first transmitter to provide the electrical power to the receiver at the determined first phase while causing the second transmitter to provide the electrical power to the receiver at the determined second phase, causing the first transmitter to no longer provide the electrical power to the receiver and causing the second transmitter to continue to provide the electrical power to the receiver.

23. A wireless power receiver comprising:
- at least one receive resonator that is configured to resonate at one or more oscillation frequencies and that is operable to be coupled to one or more transmit resonators respectively via one or more wireless resonant coupling links;
- one or more processors;
- a non-transitory computer readable medium; and
- program instructions stored on the non-transitory computer readable medium and executable by the one or more processors to:
- cause the at least one receive resonator to receive electrical power from a first transmit resonator of a wireless power transmission system; and
- engage in a phase-determination process during a handover of the at least one receive resonator to a second transmit resonator of the wireless power transmission system,
- wherein the phase-determination process is to determine a first phase at which the first transmit resonator should provide the electrical power to the at least one receive resonator during the handover and a second phase at which the second transmit resonator should provide the electrical power to the at least one receive resonator during the handover,
- wherein the at least one receive resonator no longer receives the electrical power from the first transmit resonator after the handover, and
- wherein the at least one receive resonator continues to receive the electrical power from the second transmit resonator after the handover.

* * * * *